United States Patent [19]

Takayama et al.

[11] Patent Number: 4,630,146

[45] Date of Patent: Dec. 16, 1986

[54] ROTARY HEAD TYPE REPRODUCING APPARATUS

[75] Inventors: Nobutoshi Takayama, Kanagawa; Hiroo Edakubo; Susumu Kozuki, both of Tokyo; Masahiro Takei; Kenichi Nagasawa, both of Kanagawa, all of Japan

[73] Assignee: Canon Kabushiki Kaisha, Tokyo, Japan

[21] Appl. No.: 710,091

[22] Filed: Mar. 11, 1985

[30] Foreign Application Priority Data

| Mar. 13, 1984 | [JP] | Japan | 59-48584 |
| Mar. 17, 1984 | [JP] | Japan | 59-51752 |
| Mar. 17, 1984 | [JP] | Japan | 59-51753 |
| Mar. 21, 1984 | [JP] | Japan | 59-53952 |
| Mar. 22, 1984 | [JP] | Japan | 59-55328 |

[51] Int. Cl.$^4$ ............................................. G11B 5/56
[52] U.S. Cl. ................................... 360/77; 360/10.2
[58] Field of Search ........................... 360/77, 10.2

[56] References Cited

U.S. PATENT DOCUMENTS 4,550,345 10/1985 Terada et al. ..................... 360/73
4,558,378 12/1985 Shibata et al. .................... 360/77
4,558,382 12/1985 Edakubo et al. .................. 360/77
4,563,714 1/1986 Takeuchi .......................... 360/77
4,566,045 1/1986 Weissensteiner .................. 360/77
4,568,986 2/1986 Furuhata et al. ................ 360/10.2
4,573,089 2/1986 Maeda et al. ..................... 360/77
4,581,658 4/1986 Azuma et al. ..................... 360/77
4,581,659 4/1986 Azuma et al. ................... 360/10.2
4,587,580 5/1986 Takayama et al. ................ 360/77

Primary Examiner—George G. Stellar
Attorney, Agent, or Firm—Toren, McGeady, Stanger, Goldberg & Kiel

[57] ABSTRACT

In an apparatus of the kind arranged to reproduce, with a plurality of rotary heads, an information signal from a record bearing medium having many recording tracks which are parallel to each other with the information signal recorded therein and with a plurality of different pilot signals of different frequencies also recorded one by one, one in each of the recording tracks, a plurality of different reference signals of different frequencies are simultaneously generated. A tracking error is detected by using the different reference signals together with the pilot signals which are included in signals reproduced from the plurality of rotary heads.

30 Claims, 22 Drawing Figures

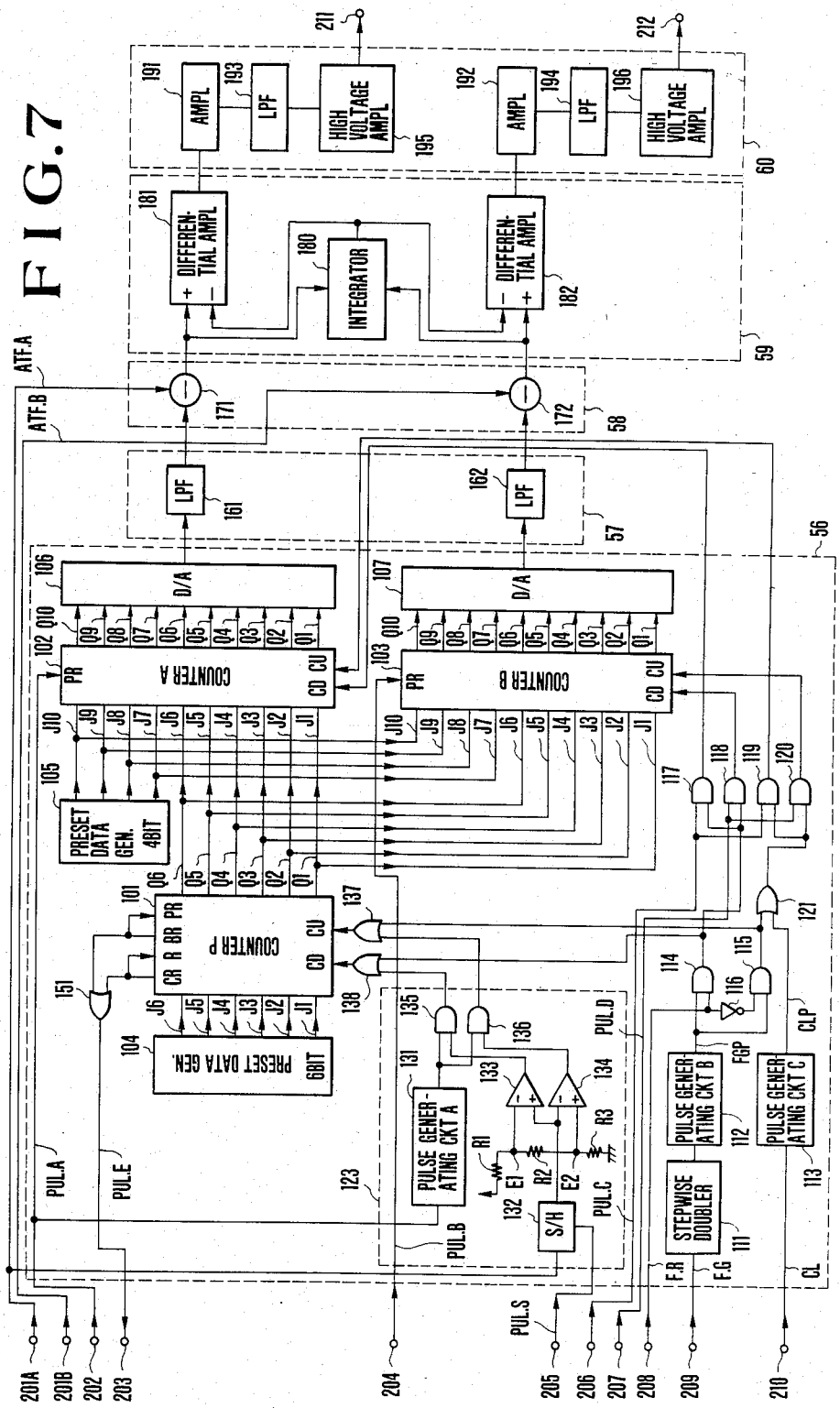

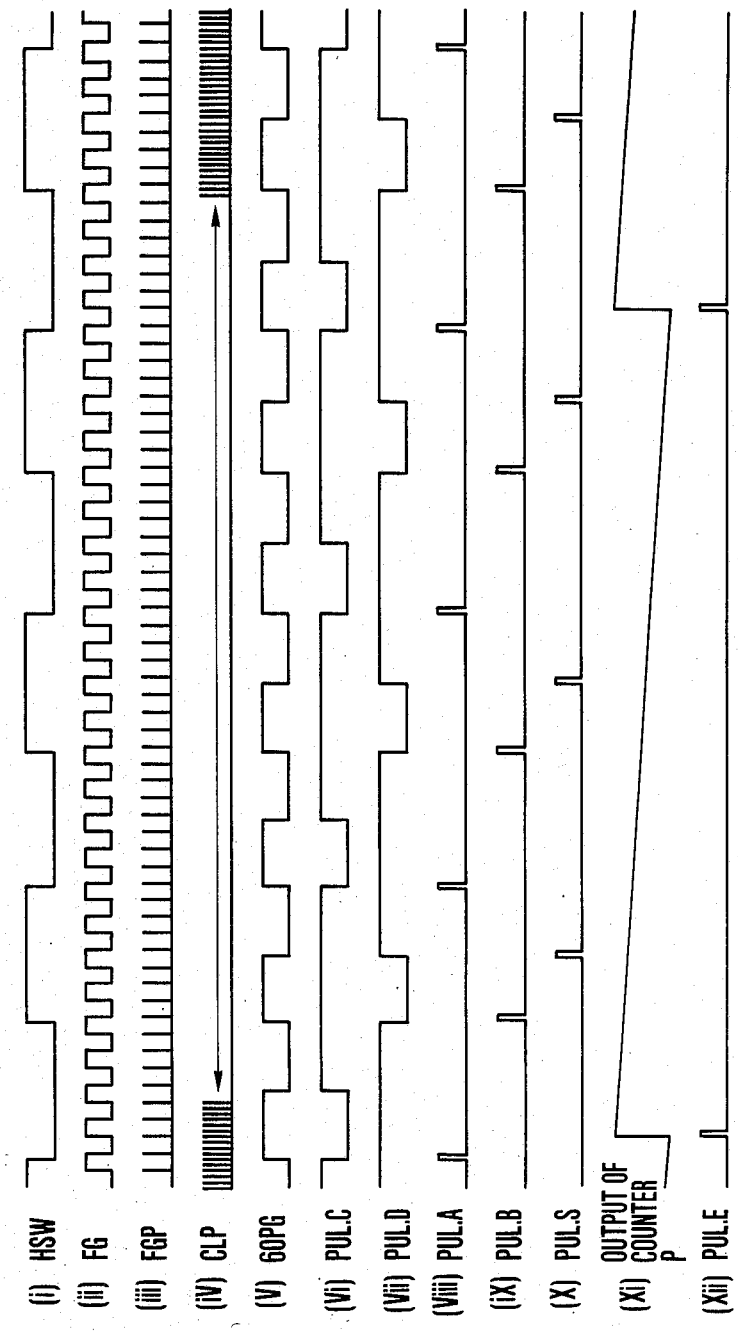

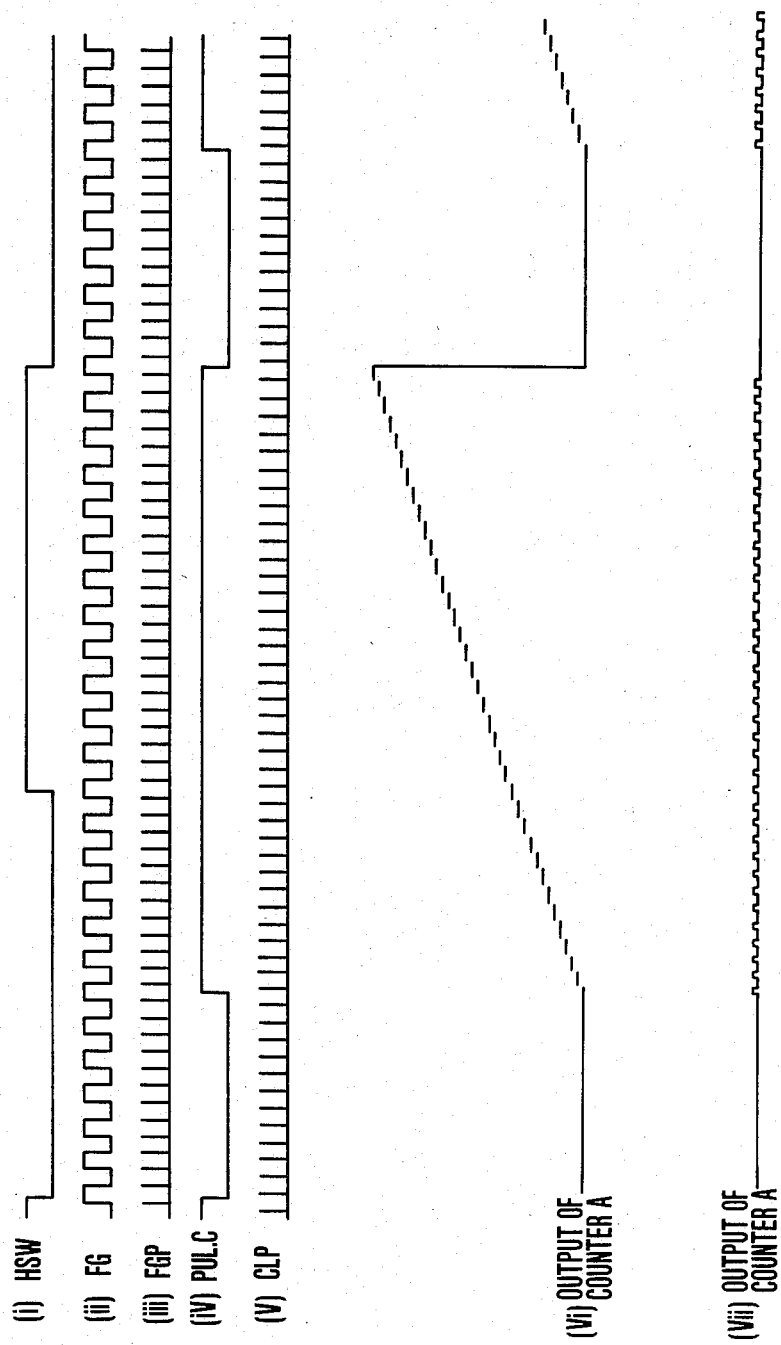

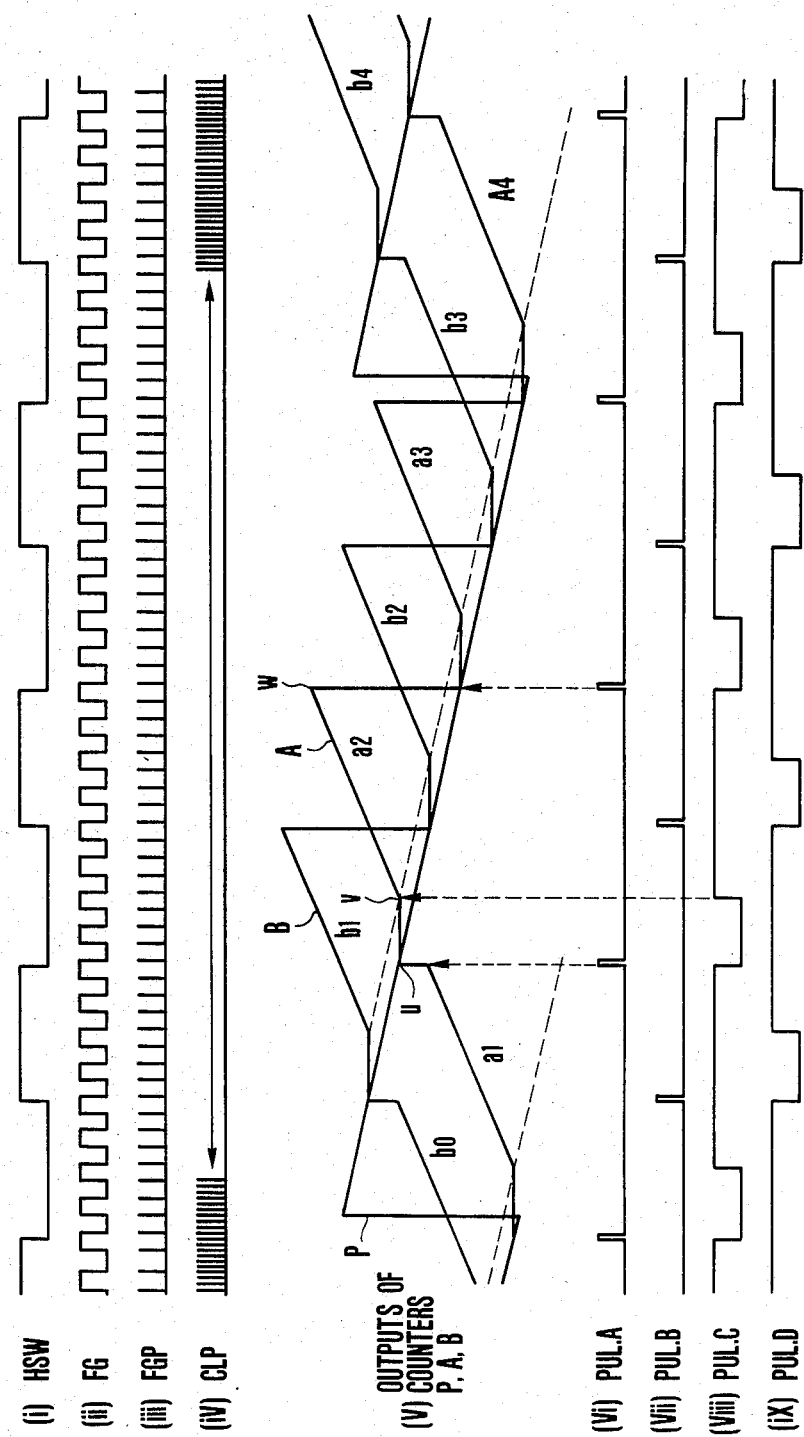

ROTARY HEAD TYPE REPRODUCING APPARATUS

BACKGROUND OF THE INVENTION

1. Field of the Invention

This invention relates to a rotary head type reproducing apparatus and more particularly to an apparatus arranged to reproduce, with a plurality of rotary heads, an information signal from a record bearing medium which has many recording tracks parallel with the information signal recorded therein and with a plurality of different pilot signals of different frequencies also recorded one by one, in each of the recording tracks.

2. Description of the Prior Art

The rotary head type recording apparatus of the above stated kind include magnetic video recording reproducing apparatus (hereinafter will be called VTR's) which are arranged to perform a reproducing operation by menas of two rotating heads forming oblique recording tracks on a magnetic recording tape, one after another. In this specification, the above stated apparatus will be described by way of example using the VTR.

In carrying out reproduction of a desired record bearing medium moving speed which differs from a speed used for recording (called special reproduction) such as high speed reproduction, low speed reproduction (including still picture reproduction), reverse reproduction, etc. with a rotary head type reproducing apparatus such as a VTR, the reproducing heads must accurately trace one recording track in each scanning field in order to prevent the occurrence of noise bars in order to obtain a reproduced picture which is sharp and stable. In one known method for meeting this requirement, a pattern signal generator is arranged to generate a pattern signal corresponding to a distance from the scanning locus of the reproducing head obtained at a desired tape travel speed to a recording track on the tape. The pattern signal obtained from the pattern signal generator controls some head shifting means such as a piezo-electric conversion element (for example, a bimorph element) which is arranged to shift the reproducing head in a direction perpendicularly crossing the rotation plane thereof.

FIG. 1 is a block diagram showing the conventional VTR of this kind and, particularly, showing the arrangement of parts thereof essentially related to the present invention. In FIG. 1, a magnetic tape 1 is employed as a record bearing medium. Reproducing magnetic heads 2A and 2B have the same azimuth angle and are opposed to each other at 180 degrees. These heads 2A and 2B are mounted on the free ends of piezoelectric conversion elements 3A and 3B, such as bimorph elements operating as shifting means, respectively. The tail ends of the conversion elements 3A and 3B are attached to a rotating member 4. The rotating member 4 is arranged to be rotated by a head rotating motor 5 in the direction of an arrow as shown in the drawing. Although it is not shown in the drawing, the heads 2A and 2B are arranged to be rotated while protruding from a slit provided between a pair of tape guide drums in a known manner. Furthermore, the tape 1 is obliquely lapped more than 180 degrees around this pair of drums. A rotation phase detector 6 is arranged to detect the rotation phase of the heads 2A and 2B and to produce a signal which is used as on a head switching signal (hereinafter referred to as HSW signal). The HSW signal is supplied to a head motor control circuit 7. The head motor control circuit 7 is arranged to control the head rotating motor 5 via a head motor driving circuit 8 on the basis of the output of the detector 6 in such a way as to rotate the heads 2A and 2B at a predetermined rotation phase and at a predetermined rotational frequency. A control signal reproducing head 9 (hereinafter referred to as the CTL head) is arranged to reproduce a control signal (CTL signal) which is recorded on the lower part of the tape 1 at intervals, each corresponding to one frame portion of the signal to be reproduced, in the longitudinal direction of the tape 1. A capstan 10 is arranged to form tape moving means for moving the tape 1 in the longitudinal direction thereof in conjunction with a pinch roller which is not shown. A capstan motor 11 is arranged to rotate the capstan 10. A frequency signal generator 12 is arranged to generate a frequency signal (hereinafter referred to as the capstan FG signal) which is representative of the rotation of the capstan 10. A capstan motor control circuit 13 is arranged to control, via a capstan motor driving circuit 14, the capstan motor 11 on the basis of the CTL signal from the CTL head 9 and the capstan FG signal from the frequency signal generator 12 in such a way as to rotate the capstan 10 at a predetermined phase and at a predetermined rotational frequency. A pattern signal generating circuit 15 is arranged to generate a pattern signal on the basis of the HSW signal from the rotation phase detector 6, the CTL signal from the CTL head 9 and the capstan FG signal from the frequency signal generator 12. The pattern signal is supplied to the piezoelectric conversion elements 3A and 3B for causing the heads 2A and 2B to trace one and the same recording track on the tape 1 in each scanning field in case where reproduction is performed at each of arbitrary varied speeds including still picture reproduction and reverse rotation reproduction among others. A conversion element driving circuit 16 is arranged to drive the conversion elements 3A and 3B based on the pattern signal from the pattern signal generating circuit 15.

FIG. 2 shows, by way of example, the details of the above pattern signal generating circuit 15. The circuit 15 is provided with input terminals 17, 18 and 19 which are arranged to receive the capstan FG signal from the frequency signal generator 12, the CTL signal from the CTL head 9 and the HSW signal from the rotation phase detector 6, respectively. A binary counter 20 is arranged to count the capstan FG signal which is supplied to the terminal 17 which is reset by the CTL signal which is supplied to the terminal 18. A timing signal generating circuit 21 is arranged to generate a timing signal on the basis of and in synchronization with the HSW signal supplied to the terminal 19. A presettable binary counter 22 is arranged to be preset by the timing signal from the timing signal generating circuit 21 with the output of the counter 20 used as a presetting data PD and to count the capstan FG signal supplied to the terminal 17. A digital-to-analog (D/A) converter 23 is arranged to D/A convert the output of the presettable counter 22. A still pattern generator 24 is arranged to generate a still picture reproducing fixed pattern signal on the basis of the timing signal coming from the timing signal generating circuit 21. An adder 25 is arranged to add together the output of the D/A converter 23 and that of the still pattern generator 24. An output terminal 26 is arranged to produce a conversion element controlling pattern signal which is the output of the adder 25.

The special reproducing operation of the VTR which is arranged as mentioned above and, particularly, the operation of the pattern signal generating circuit 15 of FIG. 2 is described with reference to FIGS. 3, 4(A) and 4(B) in the following: In FIG. 3, parts (d)–(g) show the CTL signal, the output of the counter 20 of FIG. 2, the output of the presettable counter 22 or the D/A converter 23 of FIG. 2 and the output of the adder 25 of FIG. 2, respectively, obtained at the time of reproduction performed at a speed increased 1.5 times. FIGS. 4(A) and 4(B) show the scanning center loci of the heads 2A and 2B relative to the center loci of recording tracks on the tape 1 obtained during still picture reproduction and during the 1.5 times increased speed reproduction, respectively.

With the heads 2A and 2B rotated by the head motor 5, the rotation phase detector 6 produces the HSW signal as shown at a part (a) of FIG. 3. Then, the timing signal generating circuit 21 of the pattern signal generating circuit 15 shown in FIG. 2 produces a timing signal which is synchronized with the rise and fall of the HSW signal as shown at a part (b) of FIG. 3. In accordance with this timing signal, the still pattern generator 24 produces a still pattern signal for causing the heads 2A and 2B to be continuously shifted from 0 to −1 track pitch (hereinafter referred to as TP) within a scanning range for one field.

In carrying out a so-called field still reproducing operation in which one field signal recorded in one recording track with a recording head having the same azimuth angle as the reproducing heads 2A and 2B is reproduced alternately by means of the two heads 2A and 2B, the relation of the scanning center loci of the heads 2A and 2B to the recording track on the tape 1 becomes as shown in FIG. 4(A). Referring to FIG. 4(A), full lines represent the center loci of the recording tracks of the field signal recorded by the recording head having the same azimuth angle as the reproducing heads 2A and 2B. Broken lines represent the center loci of recording tracks of a field signal recorded by a recording head having an azimuth angle which differs from that of the heads 2A and 2B. An outline arrow represents the scanning center loci of the heads 2A and 2B. Reference symbol CTL denotes the recording loci of the CTL signal. FIG. 4(B) is also drawn the same manner. As shown in FIG. 4(A), a scanning center loci "c" of the heads 2A and 2B (hereinafter referred to as the head locus "c") become a line segment diagonally connecting the beginning end of a center locus "a" of the track to be reproduced (hereinafter referred to as the track locus "a") to the terminating end of an adjacent track locus "b" on the left side of the track locus "a". To correct this deviation and to adjust the head locus "c" to the track locus "a", the heads 2A and 2B are continuously shifted from 0 to 1 TP within one field scanning range in a direction reverse to the direction in which the tape 1 travels during recording. In other words, assuming that the tape 1 travels in the direction of "+" during recording, the heads 2A and 2B are shifted in the direction of "−".

It will be understood from the above description that the still pattern signal, which is produced from the still pattern generator 24 as shown at the part (c) in FIG. 3, is capable of satisfying the requirement in shifting the heads 2A and 2B for the field still reproduction.

Meanwhile, the capstan FG signal produced from the frequency signal generator 12 with the capstan 10 rotated by the capstan motor 11 is supplied to the counters 20 and 22, which are included in the pattern signal generating circuit 15 of FIG. 2. These counters 20 and 22 count the capstan FG signal. However, since the counter 20 is reset by the CTL signal of the CTL head 9 for every one-frame portion, the upper limit of the counted value of the counter 20 is set at a value corresponding to +2 track pitches. In the event of the 1.5 times increased speed reproduction, since the CTL signal becomes as shown at a part (d) of FIG. 3, the output of the counter 20 becomes as shown at a part (e) of FIG. 3. The presettable counter 22 counts the capstan FG signal while being preset by the timing signal from the timing signal generating circuit 21 (a) part (b) of FIG. 3) at the output value of the counter 20 obtained at that time. Therefore, the count output of the counter 22 or the output of the D/A converter 23 becomes as shown at a part (f) of FIG. 3 during the 1.5 times increased speed reproduction. Accordingly, the adder 25 adds up the output of the D/A converter 23 obtained at that time and the output of the still pattern generator 24 and produces a pattern signal as shown at a part (g) of FIG. 3 during the 1.5 times increased speed reproduction.

Since the counters 20 and 22 are arranged to count the capstan FG signal, the outputs of these counters 20, 22 and the adder 25 include small stepwise variations therein. However, such variations are omitted in the drawing for simplification of illustration.

In the event of 1.5 times increased speed reproduction, the head locus in relation to the track locus on the tape 1 becomes as shown in FIG. 4(B). Referring to FIG. 4(B), reference symbols A1, A2, A3, --- denote head loci of the head 2A; B1, B2, B3, --- denote head loci of the head 2B; and a1, a2, a3, --- denote track loci of the field tracks recorded by a recording head having the same azimuth angle as the heads 2A and 2B. For the first field, the head 2A must be continuously shifted to an extent corresponding to a distance from 0 to +0.5 TP within the first field scanning range in order to adjust the head locus A1 to the track locus a1. For the second field, the head 2B must be continuously shifted to an extent corresponding to a distance from +1.5 TP to +2 TP within the second field scanning range in order to adjust the head locus B1 to the same track locus a1. In the third field, the head 2A must be continuously shifted to an extent corresponding to a distance from +1 TP to +1.5 TP within the third field scanning range in order to adjust the head locus A2 to the track locus a2. In the fourth field, the head 2B must be continuously shifted to an extent corresponding to a distance from +0.5 TP to +1 TP within the fourth field scanning range in order to adjust the head locus B2 to the track locus a3. After that, the above-stated adjustment steps are repeated in a cycle for every four field periods. The pattern signal which is shown at the part (g) in FIG. 3 is appropriate for shifting the heads 2A and 2B in the above-stated manner.

While the 1.5 times increased speed reproducing operation is described by way of example in the foregoing, the pattern signal generating circuit 15 is capable of giving other pattern signals required in controlling the heads 2A and 2B for other reproducing operations to be carried out at desired speeds other than the speed increased 1.5 times.

The pattern signal which is thus obtained from the pattern signal generating circuit 15 is supplied to the conversion element driving circuit 16. Then, the driving circuit 16 drives the piezoelectric conversion elements 3A and 3B to bring the heads 2A and 2B to an applicable reproducing track on the basis of the above-stated pattern signal and the HSW signal from the rotation phase detector 6.

On the other hand, a high density recording tendency of VTR's of recent years calls for tracing the recording tracks with fidelity. To meet this requirement many varied tracking methods have been contrived for accurately correcting the deviation of a reproducing head from the recording tracks (hereinafter referred to as a tracking error). In one of the prior art tracking methods, four pilot signals of different frequencies are superimposed on one-field portions of a video signal one after another during recording. Then, during reproduction, the pilot signals are reproduced from a reproducing track which is mainly traced by a head (hereinafter referred to as the main track) and also from adjacent tracks located on both sides of the main track. Tracking is thus carried out utilizing the pilot signals thus reproduced. In accordance with this method, the tracking error is detected by comparing the levels of the pilot signal components reproduced from the two adjacent tracks.

FIG. 5 shows a situation in which the magnetic tape 1 is arranged to have four kinds of pilot signals recorded thereon. The illustration includes a travelling direction X of the magnetic tape 1; a tracing direction Y of the heads; frequencies f1, f2, f3 and f4 of the pilot signals; and recording positions of two heads Ar and Br which are indicated by broken lines. As is well known, the two heads Ar, Br rotate at a phase difference of 180 degrees and alternately form recording tracks. One field portion of the video signal is recorded in an area a1 of each track. Each track includes another area a2. While one head Ar or Br forms the track area a1, the other head Ar or Br forms the area a2. The area a2 is formed more or less by VTR's in general. During the recent years, there have been proposed VTR's of the kind arranged to record a digital audio signal by increasing the area a2.

The pilot signal to be recorded in the area a2 of one recording track is identical with the pilot signal which has been recorded in the area a1 of another recording track formed immediately before the track. This is because the pilot signals generated during recording are switched over from one to another at every one field period and are supplied to both of the heads Ar, Br. In other words, while one of the heads Ar or Br is tracing the area a2 the other head Ar or Br is tracing the area a1 which is formed immediately before. Reference symbols Ap and Bp denote the positions of the two heads Ar, Br obtained during a normal reproducing operation.

The technical background mentioned above involves various problems. In the event of the special reproduction to be carried out with the above stated head shifting means, the tracking control with the above stated pilot signals presents a problem: With the head shifting means controlled in the manner as has been described with reference to FIGS. 1–4, the pilot signal which is recorded in the area a2 is not used in forming the pattern signal. Accordingly, no tracking is actually performed until the head Ar, Br reaches the area a1. Thus, any information signal that is recorded in the area a2 cannot be reproduced.

Furthermore, the pattern signal which is formed as shown at the part (g) of FIG. 3 would have a large change in the level every time the heads Ar, Br are switched over from one to another. Therefore, the piezo-electric conversion element A3, B3 would bring about a ringing phenomenon immediately after the switch-over of the heads Ar, Br. Then, the heads Ar, Br become incapable of accurately tracing the recording tracks.

Furthermore, in the case of special reproduction, the pilot signal recorded in the area a2 can hardly be reflected on the tracking control including the formation of a pattern signal. In this case, not all of the recording tracks are reproduced one after another in the same order as the order in which they are recorded. Therefore, when one head Ar or Br is tracing the area a1 and the other head Ar or Br the area a2, the pilot signals recorded in the main tracks being mainly traced by these heads Ar, Br differ from each other. The pilot signals recorded in two adjacent recording tracks naturally differ from each other. Therefore, when the tracking error of the head Ar or Br in the area a1 is detected, it has been hardly possible to detect the tracking error of the other head Ar or Br which is in the area a2. Tracking becomes inaccurate immediately after one of the heads Ar, Br enters the area a1 and thus degrades the reproduced signal of that part.

Furthermore, such a tracking error that arises in special or varied speed reproduction makes it difficult to select a main track. Then, it becomes difficult to discern the kind of pilot signal of the main track. Tracking control by means of pilot signals thus becomes difficult.

SUMMARY OF THE INVENTION

This invention is directed to the solution of the above stated problems of the prior art apparatus. It is therefore a general object of this invention to provide a rotary head type reproducing apparatus which is capable of solving all the problems mentioned above.

It is a more specific object of this invention to provide a rotary head type reproducing apparatus which is capable of performing a tracking operation while reproducing heads 2A, 2B are tracing any parts on the tape.

It is another object of the invention to provide a rotary head type reproducing apparatus which is capable of using every pilot signal recorded in any part on the tape for forming a pattern signal for head shifting means.

To attain the first object, the rotary head type reproducing apparatus is arranged in a preferred embodiment of the invention to reproduce, with a plurality of rotary heads, an information signal from a record bearing medium having many recording tracks which are formed in parallel to each other with the information signal recorded therein and also with a plurality of different pilot signals of different frequencies also recorded one by one in each of the recording tracks comprises: reference signal generating means for simultaneously generating a plurality of different reference signals of different frequencies; a plurality of separating means which separate the pilot signal components included in the reproduced signals produced from the plurality of heads individually for each of the heads; and a plurality of detecting means for detecting the tracking errors of the heads by using the reference signals and signals produced from the plurality of separating means.

It is a further object of the invention to provide a rotary head type reproducing apparatus which is capable of always performing an adequate tracking operation when the heads thereof reach a part where a desired information signal is recorded.

It is a further object of the invention to provide a rotary head type reproducing apparatus which is capable of generating such a pattern signal that never brings about any ringing phenomenon at the head shifting means.

To attain the second object, a rotary head type reproducing apparatus arranged as a preferred embodiment of the invention to reproduce, with a rotary head, an information signal from a record bearing medium having many recording tracks which are formed in parallel to each other with the information signal recorded therein comprises: moving means for moving the record bearing medium in a direction intersecting the many recording tracks; shifting means for shifting the rotary head in a direction which intersects the many recording tracks; first data generating means for generating, on the basis of the record bearing medium moving action of the moving means, a first data indicative of a positional relation between the rotation plane of the rotary head and one of many recording tracks relative to a predetermined rotation phase; second data generating means for generating a second data which is continuously indicative of positional relation between the rotation plane of the rotary head and one of many recording tracks by adding information on a difference in inclination between the rotation plane and the many recording tracks to the first data which is generated at a predetermined timing point; inhibiting means for inhibiting the second data generating means from adding the information on the difference in inclination at least for a portion of a period of time during which the rotary head is not reproducing the information signal; and driving means for driving the shifting means based on the second data.

It is a still further object of this invention to provide a rotary head type reproducing apparatus which is capable of selecting a recording track which is most suited as a track to be mainly traced and is capable of accurately discerning the kind of a pilot signal recorded in the main track selected.

To attain the third object, a rotary head type reproducing apparatus arranged as a preferred embodiment of the invention to reproduce, with a rotary head, an information signal from a record bearing medium having many recording tracks which are formed in parallel to each other with the information signal recorded therein and with a plurality of different pilot signals of different frequencies also recorded one by one together with the information signal comprises: reference signal generating means for selectively generating one of a plurality of different reference signals having different frequencies; separating means for separating, from a reproduced signal produced by the rotary head, the components thereof which represent the pilot signals; moving means for moving the record bearing medium in a direction intersecting the many recording tracks; pulse signal generating means for generating a pluse signal relative to the moving operation of the moving means; first control means arranged to form a control signal for controlling the moving means by using the reference signal generated by the reference signal generating means and a signal produced from the separating means; and second control means arranged to control the selecting operation of the reference signal generating means by using the control signal and the pulse signal.

These and further objects and features of the invention will become apparent from the following detailed description of preferred embodiments thereof taken in conjunction with the accompanying drawings.

BRIEF DESCRIPTION OF THE DRAWINGS

FIG. 7 is a circuit diagram showing the detailed arrangement of a conversion element control circuit.

FIG. 8 is a timing chart showing the manner in which various timing signals are generated.

FIG. 9 is a timing chart showing fixed pattern signals produced during a still picture reproducing operation and a normal reproducing operation.

FIG. 11 is a timing chart showing a fixed pattern signal produced in the event of reproduction performed at a normal ⅓ slow tape travelling speed.

DETAILED DESCRIPTION OF THE PREFERRED EMBODIMENTS

Figure 6:
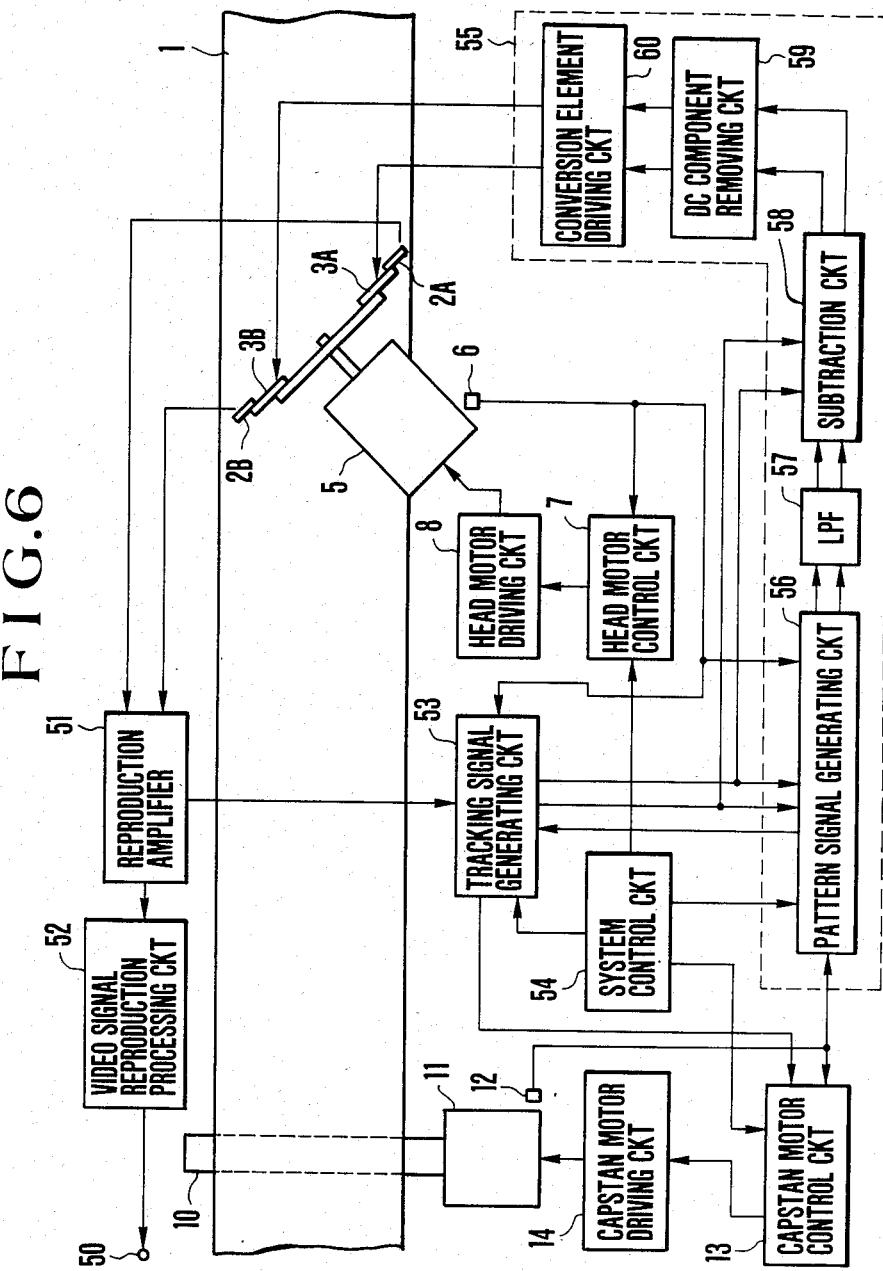
FIG. 6 is a block diagram schematically showing the arrangement of a VTR arranged as an embodiment of this invention.

FIG. 6 is a block diagram showing the arrangement of the essential parts of a VTR in arranged as an embodiment of the present invention. In FIG. 6, the magnetic tape 1 is employed as a record bearing medium. The reproducing magnetic heads 2A and 2B have the same azimuth angle and are opposed to each other at 180 degrees. These heads 2A and 2B are mounted on the free ends of the piezolectric conversion elements 3A and 3B such as bimorph elements operating as shifting means, respectively. The tail ends of the conversion elements 3A and 3B are attached to the rotating member 4. The rotating member 4 is arranged to be rotated by the head rotating motor 5 in the direction of an arrow as shown in the drawing. Although it is not shown in the drawing, the heads 2A and 2B are arranged to be rotated while protruding from a slit provided between a pair of tape guide drums in a known manner. Furthermore, the tape 1 is obliquely lapped more than 180 degrees around this pair of drums. The rotation phase detector 6 is arranged to detect the rotation phase of the heads 2A and 2B and to produce a signal which is used as a head switching signal (hereinafter referred to as the HSW signal). The HSW signal is supplied to the head motor control circuit 7. The head motor control circuit 7 is arranged to control the head rotating motor 5 via the head motor driving circuit 8 on the basis of the output of the detector 6 in such a way as to rotate the heads 2A and 2B at a predetermined rotation phase and at a predetermined rotational frequency. The capstan 10 is arranged to form tape moving means for moving the tape 1 in the longitudinal direction thereof in conjunction with a pinch roller which is not shown. The capstan motor 11 is arranged to rotate the capstan 10. The frequency signal generator 12 is arranged to generate a frequency signal (hereinafter referred to as the capstan FG signal) which is representative of the rotation of the capstan 10. The capstan motor control circuit 13 is arranged to control, via the capstan motor driving circuit 14, the capstan motor 11 on the basis of a tracking control signal from a tracking signal generating circuit to be described later and the capstan FG signal from the frequency signal generator 12 in such a way as to have the capstan 10 rotated at a predetermined phase and at a predetermined rotational frequency.

As mentioned above, a reproduced signal obtained from the reproducing heads 2A and 2B includes a video signal and the pilot signals which are to be used for tracking. The reproduced signal is amplified by a reproduction amplifier 51 and is formed into a continuous signal by means of the HSW signal. The continuous signal is supplied to a video signal reproduction processing circuit 52 and a tracking signal generating circuit 53. The video signal reproduction processing circuit 52 is arranged to separate the video signal from the output of the reproduction amplifier 51 and to process it through demodulation, etc. into its original signal form. The reproduced video signal which is thus processed is supplied to an output terminal 50. Meanwhile, at the tracking signal generating circuit 53, the pilot signal component is separated from the output of the reproduction amplifier 51 as described later in detail. Then, the levels of pilot signals obtained from the two adjacent tracks are compared with each other and a tracking control signal is obtained by detecting the tracking error of each of the heads 2A and 2B.

A system control circuit 54 is arranged to control the operations of various components of the apparatus according to the operating mode of the apparatus. The head motor control circuit 7, the capstan motor control circuit 13, the tracking signal generating circuit 53, a pattern signal generating circuit 56 which will be described later, etc. operate differently during reproduction than they do during recording, and their operations also vary with the designated travelling speed of the tape 1. The system control circuit 54, therefore, produces a control signal which makes each of them operate in a manner suited for the operating mode of the apparatus.

A conversion element control circuit 55 includes the pattern signal generating circuit 56, a low-pass filter (LPF for short) 57, a subtraction circuit 58, a DC component removing circuit 59 and a conversion element driving circuit 60. The above-stated piezoelectric conversion elements 3A and 3B are driven by the output of the conversion element control circuit 60 to cause the reproducing heads 2A and 2B to accurately trace one and the same recording track in each scanning field.

Explanation of the pattern signal generating circuit

FIG. 7 shows the details of the above-stated conversion element control circuit 55. The circuit 55 drives these conversion elements 3A and 3B by generating the conversion element controlling pattern signal as described below with reference to FIG. 7.

The pattern signal generating circuit 56 mainly includes a counter P 101, a counter A 102 and a counter B 103. Each of these counter P 101, A 102, B 103 is arranged to have up- and down-count inputs in parallel and is provided with a down-count input terminal CD and an up-count input terminal CU. In this specific embodiment, these counters 101P, 102A and 103B are binary counters.

In order to obtain a fixed pattern signal which in necessary for the noiseless special reproducing operation mentioned in the foregoing, the signal must include at least phase information required for accurately adjusting the thrusting position of the reproducing head 2A, 2B to the reproducing track which varies with the travel of the tape 1, and speed information required for bringing the tracing locus of the reproducing head 2A, 2B corresponding to the travelling speed of the tape 1, into agreement with the gradient of the reproducing track. In the pattern signal generating circuit 56 shown in FIG. 7, the above-stated phase information is obtained by means of the counter P 101 and the speed information by means of the counter A 102 and the counter B 103.

In obtaining the phase information, the counter P 101 operates as follows: The counter P 101 carries up the count thereof when it counts up a number (2n) two times as many as a number (n) of the pulses of the capstan FG signal which are produced when the tape 1, moves to an extent of 2 TP's, and the counter p 101 produces a carry signal from a teminal CR thereof. Then, the carry signal is supplied to a reset terminal R of the coutner P 101 to have the counter P 101 reset thereby. The counter P 101 carries down the count thereof when it likewise counts down 2n times and then produces a borrow signal. This borrow signal is supplied to a preset terminal PR of the counter P 101 to preset the counter P 101 at a preset data which is generated by a preset data generator 104 and corresponds to 2n. Assuming that the number (n) of pulses of the capstan FG signal generated when the tape 1, moves to the extent of 2 TP's is 24, for example, the counter P 101 repeatedly counts up from 0 to 48. In the event of down counting, it repeatedly counts down from 48 to 0.

The pattern signal generating circuit 56 is provided with an input terminal 209 which is arranged to receive the capstan FG signal; a frequency stepwise doubler 111 which is arranged to generate pulses at the rise and fall of the capstan FG signal; a pulse generator B 112 which is arranged to narrow the width of the pulses produced from the frequency stepwise doubler 111; and a terminal 208 which is arranged to receive a high level signal from the system control circuit 54 when the tape 1 is travelling in the forward or positive direction (or in the same direction as the direction taken in recording) and a low level signal when the tape 1 is travelling in the negative direction (or the direction reverse to the recording direction). Hereinafter, these high and low level signals will be called the F/R signal. The F/R signal is arranged to be supplied to an AND gate 115 via an AND gate 114 and an inverter 116. Therefore, the output pulses of the pulse generator B 112 are supplied to the terminal CD of the counter P 101 via the AND gate 114 and an OR gate 138 when the tape 1 is travelling in the positive direction and is supplied to the terminal CU of the counter P 101 via the AND gate 115 and an OR gate 137 when the tape 1 is travelling in the negative direction.

With the pattern signal generating circuit 56 arranged in this manner, the output data of the counter P 101 always indicates relative positional discrepancy (relative phase information) between a track to be reproduced on the travelling tape 1 (which is formed by a recording head having the same azimuth angle as the heads 2A and 2B) and the thrusting position of the reproducing head 2A, 2B. Therefore, the thrusting position of each reproducing head 2A, 2B is controllable by virture of this output data. However, since this phase information is nothing more than information on a relative phase, the information is usable only in cases where the just preceding thrusting postion of the reproducing head 2A, 2B coincides with the reproducing track. In the case of this embodiment, therefore, while the above-state relative phase information is generated by the counter P 101 beforehand, the thrusting position of the reproducing head 2A, 2B is arranged to be adjusted to the reproducing track. This function is performed by a thrusting position control circuit 123 shown in FIG. 7. This circuit 123 is arranged to generate absolute phase adjusting pulses and to control the reproducing head 2A, 2B by means of the adjusting pulses in the direction of bringing the thrusting position of the reproducing head 1A, 2B into agreement with the reproducing track even when they are not coinciding with each other. This thrusting phase control circuit 123 will be described in further detail later, after the description of the whole pattern signal generating circuit 56 ends.

The pulse signal to be up counted or down counted by the counter P 101 is obtained by doubling the capstan FG signal in a stepwise manner. This arrangement is made for the purpose of increasing the accuracy of the above-stated phase information. In other words, this arrangement effectively prevents the phase information from becoming coarse due to reduction in the pulse generating number of the capstan FG signal relative to TP as a result of a high density recording tendency.

Although it will become apparent from further description given later on, the pulse width is narrowed by the pulse generating circuit B 112, because: Each of the counters P 101, A 102, B 103 might sometimes up or down count a plurality of pulse signals and is arranged to be capable of performing operations equivalent to addition and subtraction therein. In other words, the pulse generating circuit B 112 is provided for the purpose of preventing, when a plurality of pulse signals are concurrently supplied, a counting operation on one of them. A pulse generating circuit A 131 and a pulse generating circuit C 113 are also provided for the same purpose and will be omitted from the following description:

As described in the foregoing, the counter P 101 down counts the pulses related to the capstan FG signal when the tape 1 is travelling in the normal direction and to up count them when the tape 1 is travelling in the reverse direction. Such being the arrangement, the counter P 101 is capable of producing the relative phase information on the thrust position of the reproducing head 2A, 2B the instant the head 2A, 2B is thrusted forward to the reproducing track regardless of the travelling direction of the tape 1. For example, in the case of slow motion reproduction which is performed by allowing the tape 1 to travel in the forward direction at a speed $\frac{1}{3}$ of the recording speed (hereinafter referred to as forward $\frac{1}{3}$ slow speed reproduction) and in the case of slow motion reproduction which is performed by allowing the tape 1 to travel in the reverse direction at a speed $\frac{1}{3}$ of the recording speed (hereinafter referred to as reverse $\frac{1}{3}$ slow speed reproduction), the counter P 101 operates as follows: The output of the counter P 101 repeats 48→0 for every field scanning period in the forward $\frac{1}{3}$ slow speed reproduction and repeats 0→48 for every 6 field scanning periods in the case of the reverse $\frac{1}{3}$ slow speed reproduction. Assuming that the shifting extent of the conversion element 3A, 3B is zero, if the output of the counter P 101 is 16 when the head 2A, 2B is thrust forward, for example, the thrusting position of the reproducing head 2A, 2B relative to the reproducing track deviates to an extent corresponding to $\frac{2}{3}$ TP in the negative direction in either the forward $\frac{1}{3}$ slow speed reproduction or the reverse $\frac{1}{3}$ slow speed reproduction.

The number of bits required for the counter P 101, in the case of a binary counter, must be arranged to be a sufficient number for indicating in the binary system the value 2n (48 in this embodiment) and is 6 bits in this case.

The data which is thus obtained by the counter P 101 is read out at a predetermined timing as the rotating head rotates to obtain thereby information on the thrusting phase of the reproducing head 2A, 2B relative to the track to be reproduced.

Next, the counter A 102 and the counter B 103, which operate by using the above-stated information, operate as follows: These counters A 102 and B 103 are arranged to produce fixed pattern signals including the above-stated phase information and speed information. In addition to the phase information obtained from the counter P 101, the counters A 102 and B 103 generate the speed information which is to be used for correcting a difference in inclination which takes place between the track to be reproduced and the tracing locus of the reproducing head 2A, 2B when the tape 1 is allowed to travel at a speed differing from the recording speed while the reproducing heads 2A and 2B are scanning the tape 1. As for the number of bits required for the counter A 102 and the counter B 103, each of them is arranged to have 10 bits in this specific embodiment. However, the number of bits should be determined according to the shifting degree of the conversion element 3A, 3B, that is, based on a desired maximum tape speed at which high speed search reproduction is to be carried out.

Each of the counters A 102 and B 103 is loaded with the output data of the counter P 101 as a lower 6 bit data at a predetermined timing related to the rotation of the heads 2A and 2B. This loading timing is determined by a signal which is obtained according to the HSW signal. The load signal (PUL-A) of the counter A 102 is supplied from a terminal 302 and the load signal (PUL-B) of the counter B 103 from a terminal 204. The inputs PUL-A and PUL-B are applied respectively to the preset terminals PR of the counters A 102 and B 103. Where the heads 2A and 2B are rotating with their phases deviating 180 degrees from each other, the inputs PUL-A and PUL-B are, of course, supplied at phases differing 180 degrees from each other.

With the inputs PUL-A and PUL-B respectively supplied to the terminals PR, each of the counters A 102 and B 103 is loaded with an initial data of lower 6 bits. As mentioned in the foregoing, the output data of the counter P 101 is used as the initial data of lower 6 bits. Meanwhile, higher 4 bits of these counters P 101, A 102, B 103 are generated by a preset data generating circuit 105. In the case of this embodiment, the data to be supplied from the circuit 105 is 1000. This data is used for the purpose of having the output data of each of the counters A 102 and B 103 at a level close to the 0 level when the output data is D/A converted as a so-called offset binary data. More specifically, in this case, the initial data to be loaded is from 1000000000 to 1000110000 and thus the initial data comes close to 0. This is preferable because not much DC component will be generated, which will be described later herein. With the output data of the preset data generating circuit 105 based on the concept of avoiding the generation of the DC component, it is more preferable to have the output data changed in accordance with the travelling speed of the tape 1 designated. For example, in the event of allowing the tape 1 to travel in the forward direction at a speed increased by ten times, the preset data generating circuit 105 produces a data of 1011. If the tape 1 is allowed to travel in the reverse direction at a speed increased six times, the circuit 105 produces a data of 0101.

With the counter A 102 and the counter B 103 thus provided with the initial data, these counters A 102, B 103 count, in the same manner as the above-stated counter P 101, the pulses which are of a narrow pulse width and which have a frequency twice as high as the frequency of the capstan FG signal produced by the pulse generating crcuit B 112. Furthermore, the counter A 102 and the counter B 103 count a clock pulse signal CL which is supplied to them from a terminal 210 via a pulse generating circuit C 113 regardless of the tape 1 travel speed.

The clock pulses which are produced from the pulse generating circuit C 113 are constantly led to the terminals CU of these two counters A 102 and B 103. Meanwhile, pulses which are produced from the pulse generating circuit B 112 are arranged to be led to the terminals CD of these counters A 102 and B 103 when the tape 1 is travelling in the positive or forward direction and to the terminals CU of these counters A 102 and B 103 when the tape 1 is travelling in the negative or reverse direction. The reason for this arrangement resides in that, as is well known, even at the same tape 1 travelling speed, the difference in inclination or gradient between the tracing locus of the reproducing head 2A, 2B and the track to be reproduced varies according to the travelling direction of the tape 1. For example, assuming that the tape 1 travelling speed employed in recording is "v" and the tape travelling speed employed in reproduction is Nv (N representing a speed in the positive direction when it is of a positive value and a speed in the negative direction when it is of a negative value), the extent to which the reproducing head 2A, 2B must be shifted during one field period is proportional to a value (n−1) times as much as the TP.

The frequency of the pulses produced from the pulse generating circuit B 112 is proportional to the absolute value of the tape 1 travelling speed. Therefore, an inclination proportional to the value N is obtained by counting the pulses produced from the pulse generating circuit B 112. The pulses are down counted when the tape 1 is travelling in the positive direction and are up counted when the tape 1 travels in the negative direction to obtain an inclination proportional to the value −N. Meanwhile, an inclination necessary for shifting the reproducing head 2A, 2B to an extent corresponding to 1 TP when one field period is proportional to 1. In view of this, an inclination of +1 can be obtained by counting a number of pulses corresponding to 1 TP (48 in this embodiment) within one field period. A desired inclination which is in proportion to (1−N) can be obtained with these operations carried out at the same time.

The frequency of the clock pulses generated by the pulse generating circuit C 113 becomes fv×48 Hz, wherein "fv" represents a field scanning frequency.

A terminal 206 is arranged to receive a rectangular wave signal PUL-C which is for designating a period for counting the above-stated pulses by the counter A 102. The signal PUL-C causes AND gates 117 and 119 to perform gate operations on the pulses. A terminal 207 is arranged to receive a rectangular signal PUL-D which is for designating a period for counting the pulses by the counter B 103. The signal PUL-D likewise causes AND gates 118 and 120 to perform gate operations on the pulses. An OR gate 121 is arranged to supply the pulse output of the pulse generating circuit B 112 and that of the pulse generating circuit C 113 to the counters A 102 and B 103.

In the period during which the reproducing heads 2A and 2B trace the recording tracks on the tape 1, the counters A 102 and B 103 thus take in from the counter P 101 the initial data required for determining the thrusting positions of the heads 2A, 2B and count the pulses to obtain inclinations proportional to the inclination of the tracing locus of the reproducing heads 2A, 2B and that of the recording track. By this arrangement, a fixed pattern signal can be generated in the form of a digital data to enable each of the reproducing heads 2A, 2B to accurately trace a desired recording track while the tape 1 is allowed to travel at an arbitrary speed.

Figure 1:
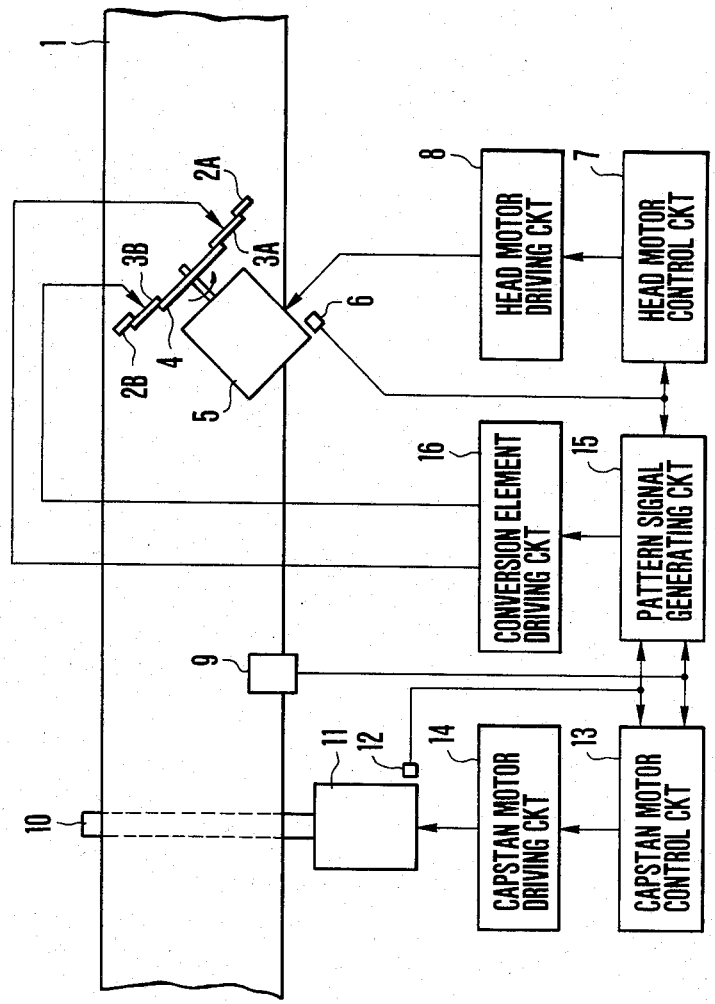
FIG. 1 is a block diagram showing, by way of example, the conventional rotary head type reproducing apparatus or a VTR and particularly the arrangement of parts thereof essentially related to this invention.
Figure 2:
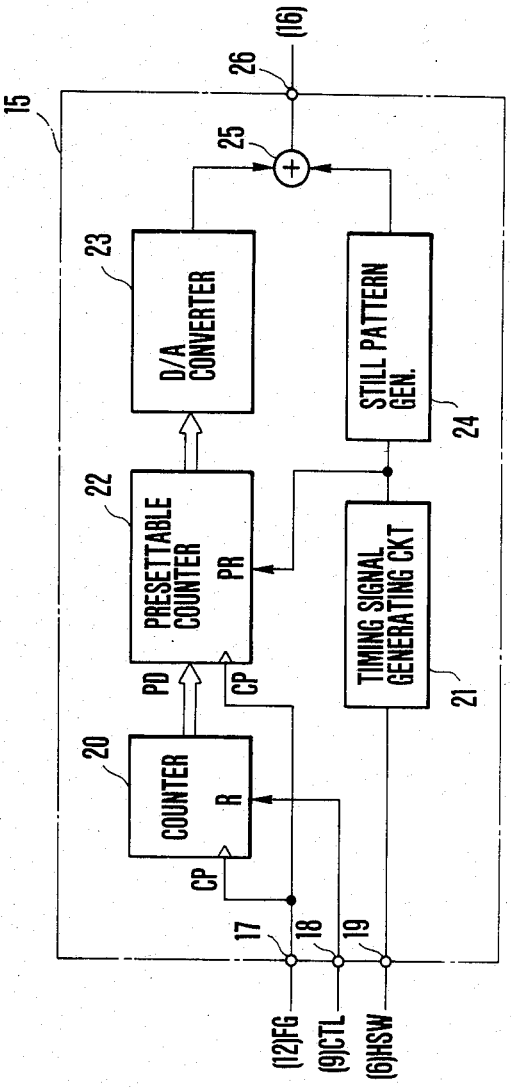
FIG. 2 is a block diagram showing a specific example of the details of a pattern signal generating circuit which is included in FIG. 1.
Figure 3:
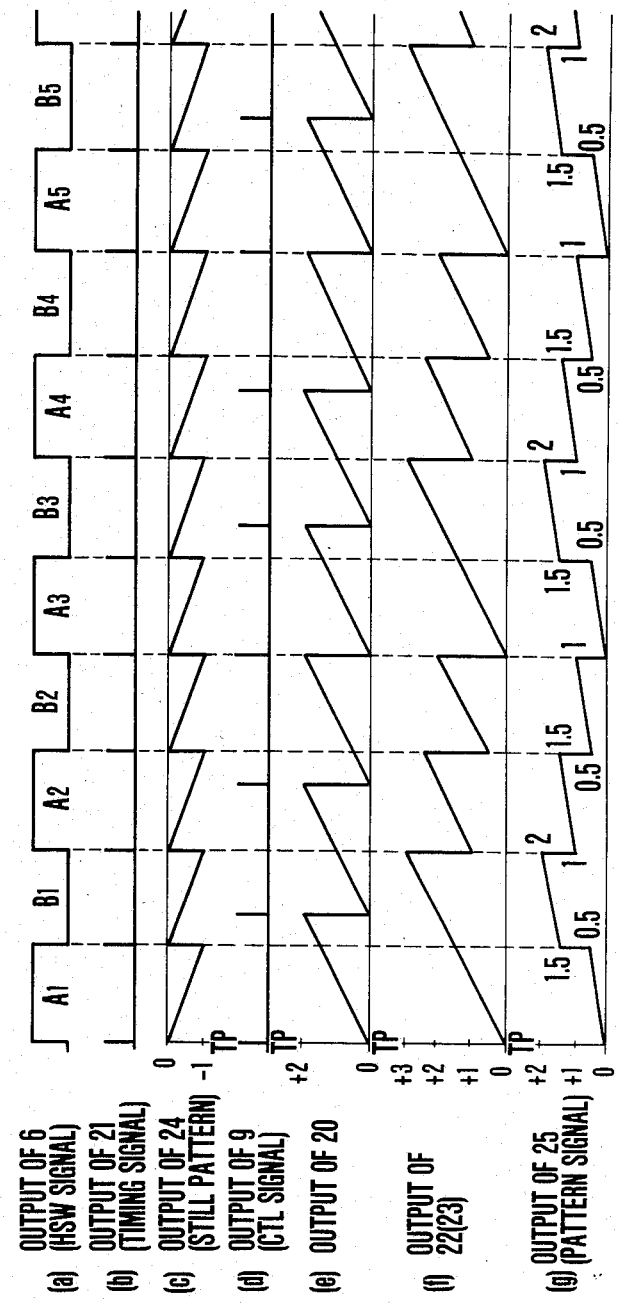
FIG. 3, consisting of (a)–(g), is a wave form chart showing the input and output wave forms of various circuit elements of FIG. 2 as obtained during a reproducing operation which is performed at a tape speed increased, by 1.5 times.
Figure 4A:
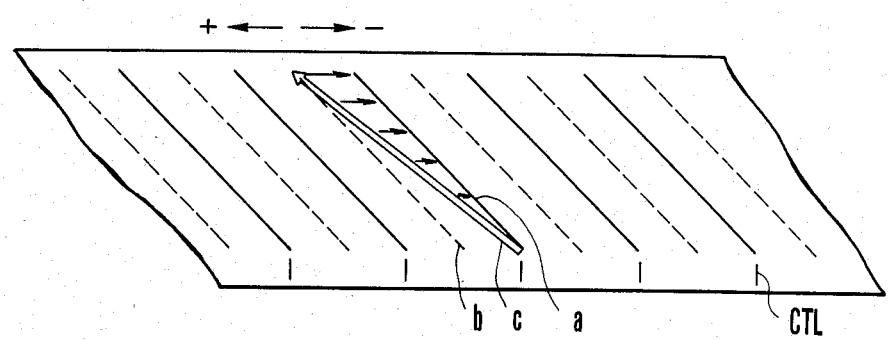
FIGS. 4(A) and 4(B) are illustrations of relations between the scanning center loci of the heads of the VTR and the center loci of recording tracks on a tape obtained respectively during still picture reproduction and during reproduction performed at a tape travelling speed increased by 1.5 times.
Figure 4B:
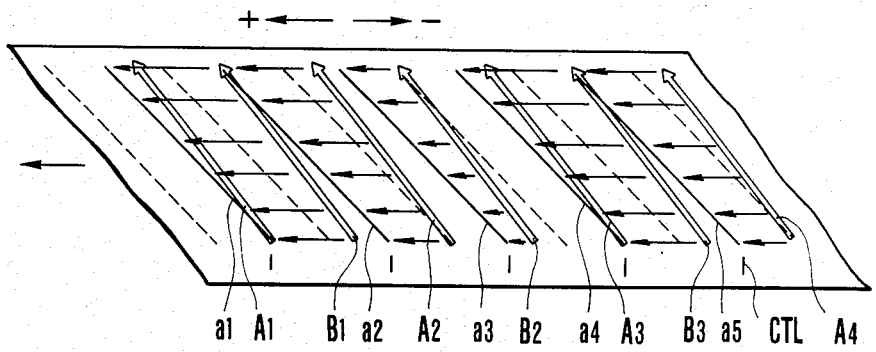
Figure 5:
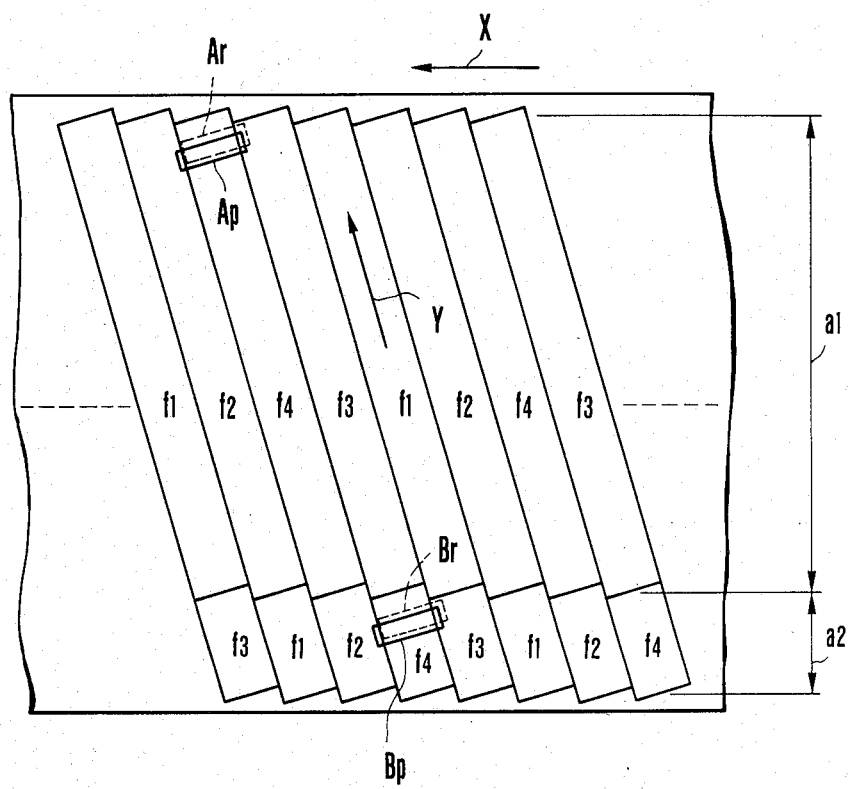
FIG. 5 is an illustration of a magnetic tape under the operation of a VTR.

The manner in which the timing signals are generated in this embodiment is described in detail as follows with reference to the timing chart of FIG. 8. Referring to FIG. 8, a part (i) shows the HSW signal and indicates a period of time when one field portion of a video signal is being reproduced from each recording track by the reproducing head 2A when the HSW signal is at a high level and by the other reproducing head 2B when the HSW signal is at a low level (i.e., a period of time when the area a1 shown in FIG. 5 is being traced). When the value fv is 60 Hz, the HSW signal is a rectangular wave signal of 30 Hz and is supplied as timing pulses of 30 Hz related to the rotation of the head and 30 PG to each of the applicable parts of the apparatus. A part (ii) shows the capstan FG signal. A part (iii) shows pulses (FGP) generated by the pulse generating circuit B 112 in relation to the capstan FG signal. Both the wave forms of the parts (ii) and (iii) are obtained in the event of the forward or positive ⅓ slow speed reproduction. A part (iv) shows pulses (CLP) which are generated by the pulse generating circuit C 113 by narrowing the width of the clock pulses (CL) supplied from a terminal 210. A part (v) shows timing pulses of 60 Hz (60 PG) which are phase locked with reference to the HSW signal. A part (vi) shows the rectangular wave signal (PUL-C) supplied to a terminal 206. A part (vii) shows the rectangular wave signal (PUL-D) supplied to the terminal 207. A part (viii) shows the pulses (PUL-A) supplied to a terminal 202 for the purpose of presetting the counter A 102. A part (ix) shows the pulses (PUL-B) supplied to a terminal 204 for presetting the counter B 103. A part (x) shows sampling pulses (PUL-S) supplied to a terminal 205. A part (xi) is an analog representation of the data produced from the counter P 101. Another part (xii) shows pulses (PUL-E) produced from a terminal 203.

Since the reproducing head 2A reproduces one field portion of the video signal from each recording track during the high level period of the HSW signal (i), this period (corresponding to a period when the area a1 is being traced) it is theoretically sufficient for an effective period of the fixed pattern signal (or a period during which the above-stated phase information and the speed information are included in the signal). In actuality, however, the piezoelectric conversion element 3A, 3B brings about a ringing phenomenon in response to a sudden change in the impressed voltage. Furthermore, a tracking control signal must be obtained from the area a2 shown in FIG. 5 as described above. In this embodiment, therefore, the effective period of the fixed pattern signal, i.e. the period during which the counter A 102 can count the output of the pulse generating circuit B 112 and that of the pulse generating circuit C 113, is arranged to include not only the high level period of the HSW signal but also a ½ field scanning period immediately before that. This effective period is obtained as a period during which the pulse signal PUL-C shown in the part (vi) is at a high level. This signal PUL-C (vi) can be readily obtained from the HSW signal (i) and the 60 PG signal (v) through a logic circuit (not shown in the drawing). The PUL-D signal (vii) is also formed as shown in FIG. 8 for the same reason.

The timing at which the counter A 102 and the counter B 103 take in the initial data is determined by the pulse signal PUL-A (ix) and the pulse signal PUL-B (viii) which are supplied to the terminals PR of these counters A 102, B 103. Any timing may be used for that purpose as long as it is not included in the effective period of the fixed pattern signal. In this specific embodiment, the above-stated timing is arranged to be immediately after the effective period of the fixed pattern signal for the purpose of avoiding any excessive level change in the fixed pattern signal immediately before the effective period thereof, so that the above-stated ringing phenomenon can be prevented. The pulse signals PUL-A (ix) and PUL-B (viii) can be formed by using the falls of the pulse signals PUL-C (vi) and PUL-D (vii). As for the pulse signals PUL-S (x) and PUL-E (xii), their details of them will be described later herein.

The fixed pattern signal obtainable by this embodiment is described in further detail with the tape 1 travelling speed set at some specific values as follows: FIG. 9 is a timing chart which shows at the parts (vi) and (vii) thereof the fixed pattern signals obtained in cases where the tape 1 travelling speed is 0 (or in the event of still picture reproduction) and where the tape 1 speed is the same as the recording speed (or standard reproduction). In FIG. 9, the parts (ii) and (iii) respectively show the signals FG and FGP which are obtained during the standard reproduction. At the parts (vi) and (vii), the data produced from the counter A 102 is shown in an analogous manner. In still picture reproduction, the signal FGP is not produced and the signal CLP is alone counted by the counters A 102 and B 103. As a result, the output of the counter A 102 becomes as shown at the part (vi) of FIG. 9. Furthermore, since the data produced from the counter P 101 is always of a constant value, the output of the counter B 103 has the same wave form as the wave form shown at the part (vi) in FIG. 9 with the phase thereof differing 180 degrees from the latter. In case of the standard reproduction on the other hand, the signals FGP and CLP have the same frequency. The counters A 102 and B 103 in this instance down count the signal FGP and up count the signal CLP within the effective period of the fixed pattern signal. Their outputs thus become almost unvarying. In this instance, the output of the counter B 103 has a wave form which is obtained by shifting the output (vii) of the counter A 102 to an extent corresponding to a level required in driving the conversion element 3A, 3B an extent corresponding to 1 TP. This is because the point of time at which the counter B 103 takes in the output value of the counter P 101 differs from the point of time at which the counter A 103 takes it in as much as one field scanning period and during that difference period, the counter P 101 further counts the signal FGP to an extent corresponding to 1 TP.

Figure 10A:
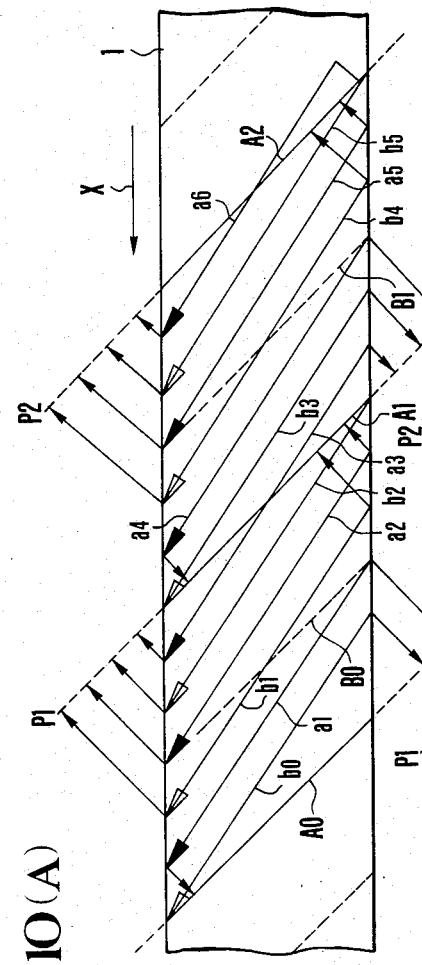
FIGS. 10(A) and 10(B) are illustrations of relations which take place between recording tracks and the tracing loci of the reproducing heads during reproducing operations performed at a ⅓ slow tape travelling speed in the normal and reverse directions.
Figure 10B:
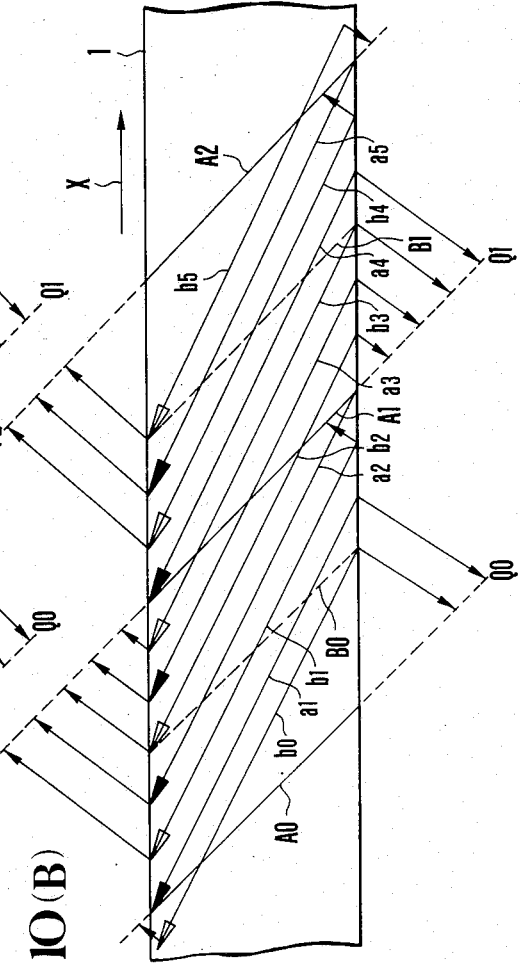
Figure 12:
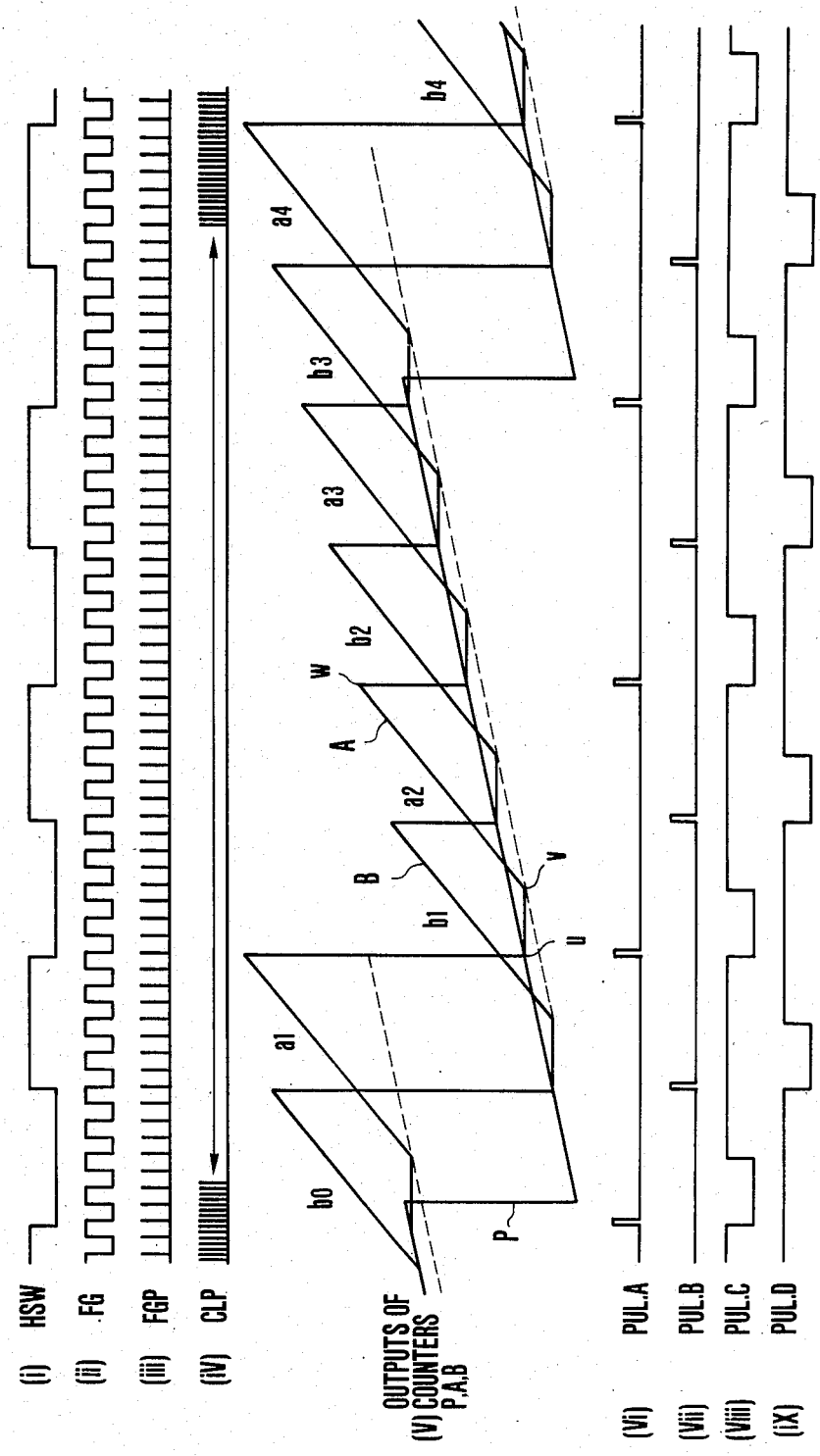
FIG. 12 is a timing chart showing a fixed pattern signal produced in the event of reproduction performed at a reverse ⅓ slow tape speed.

FIGS. 10(A) and 10(B) show the relations of the tracing loci of the reproducing heads 2A, 2B to the recording tracks on the tape 1 obtained during forward and reverse ⅓ slow speed reproducing operations. FIG. 11 is a timing chart showing at the part (v) thereof, the fixed pattern signal obtained during the forward ⅓ slow speed reproduction. FIG. 12 is a timing chart showing at a part (v) thereof the fixed pattern signal obtained during the reverse ⅓ slow speed reproduction.

Referring to FIGS. 10(A) and 10(B), reference symbols A0, A1 and A2 respectively denote the center lines of recording tracks formed by a recording head having the same azimuth angle as that of the reproducing heads 2A and 2B. Symbols B0 and B2 denote center lines of recording tracks formed by a recording head having an azimuth angle different from that of the reproducing heads 2A and 2B. Reference symbols a1–a6 denote the center lines of the tracing loci of the head 2A obtained when displacement by the conversion element 3A is assumed to be zero. Reference symbols b0–b5 denote center lines of the tracing loci of the head 2B obtained when displacement by the conversion element 3B is assumed to be zero. The arrow X identifies the travelling direction of the tape 1.

The normal of reverse ⅓ slow speed reproduction is performed, as is well known, by tracing every other recording track six times. For example, in the case of FIG. 10(A), the recording track A1 is traced six times by the tracing actions as indicated by the tracing loci b1, a2, b2, a3, b3 and a4. As a result of that, fixed patterns A and B (analogous representation of the output data of the counters A 102 and B 103) are generated in this embodiment as shown at the part (v) of FIG. 11. At the part (v), a symbol P denotes an analogous representation of the output data of the counter P 101.

Again referring to FIG. 10(A), in adjusting the tracing locus a2 to the track A1, for example, the output of the counter P 101 is taken in by the counter A 102 at a point of time "u" in FIG. 11. At a point "v", the counter A 102 begins to count. The counter A 102 stops counting at another point "w" and again takes in the output of the counter P 101 at that point. It will be apparent, with reference also to the illustration of FIG. 10(A), that a desired fixed pattern signal can be obtained by repeating these steps.

FIG. 12 likewise shows fixed patterns obtainable by the this embodiment as indicated by reference symbols A and B at a part (v) of FIG. 12. Another symbol P denotes the anlogous representation of the output data of the counter P 101. At a point "u", the counter A 102 likewise takes in the output data of the counter P 101. The counter A 102 begins to count at a point "v" and stops counting at a point "w". The counter A 102 again takes in the output of the counter P 101 at the point "w". FIG. 12 in conjunction with FIG. 10(B) clearly shows that a desired fixed pattern signal is obtainable by the embodiment.

While the tracing locus of the head can be adjusted to the recording track in the manner as described above, the phase information thus obtained is nothing more than relative information as mentioned in the foregoing. Therefore, to bring the phase information closer to absolute information by adjusting the thrusting-in position of the reproducing head to a recording track to be reproduced, the embodiment is provided with the thrusting-in phase control circuit 123.

The thrusting-in phase control circuit 123 is arranged as follows: In this specific embodiment, a tracking control signal is used for the adjustment of the thrusting-in phase. This tracking control signal is supplied from the tracking control circuit 53 which is described in the foregoing. This embodiment is arranged to perform the above-stated 4 f type tracking operation. Therefore, the tracking signal is available from each of the reproducing heads 2A and 2B while the reproduced pilot signal is being obtained from them. As is apparent from FIGS. 6 and 7, the tracking control signals ATF-A and ATF-B which are obtained from the reproducing heads 2A and 2B are subtracted from the fixed pattern signals to be used for the heads 2A and 2B. This is for the purpose of correcting the deviation of the tracing loci of the reproducing heads 2A and 2B which takes place from the track when the conversion elements 3A and 3B are driven simply by the fixed pattern signals. Therefore, the fixed pattern signals are shifted by means of a tracking control signal ATF-A or ATF-B.

The signal ATF-A, which is supplied to a terminal 201A, is sampled and held by a sample-and-hold circuit (S/H) 132 which uses as a sampling pulse the timing pulse signal PUL-S arranged to indicate an intermediate timing of each scanning field. The timing of the signal PUL-S is as shown in FIG. 8. The output of the sample-and-hold circuit 132 is supplied to a voltage detection circuit which includes comparators 133 and 134 and resistors R1, R2 and R3. The comparator 133 produces a high level output when the output of the circuit 132 is higher than a predetermined voltage E1. The comparator 134 produces a high level output when the output of the circuit 132 is lower than another predetermined voltage E2 which is lower than the voltage E1.

The output of the comparator 133 is supplied to an AND gate 135 and that of the comparator 134 to an AND gate 136. The pulses from a pulse generating circuit A 131 are gated by these AND gates 135, 136. The pulse generating circuit A 131 narrows the pulse width of the above-stated pulse signal PUL-A and supplies the narrowed pulses to the AND gates 135 and 136. If the signal ATF-A is higher than the value E1 at the timing of the pulse signal PUL-S, the AND gate 135 supplies pulses to the terminal CD of the counter P 101. If the signal ATF-A is lower than the value E2 at the timing of the signal PUL-S, the AND gate 136 supplies pulses to the terminal CU of the counter P 101.

This arrangement is based on the assumption that: The thrusting position of the reproducing head 2A is ahead of the track when the signal ATF-A is higher than the predetermined voltage E1; is approximately on track when the signal ATF-A is between the predetermined voltages E1 and E2; and is behind the track when the signal is lower than the voltage E2. More specifically, if the thrusting position of the head 2A is ahead of the track, the counter P 101 is caused to down count once for every 2 filed scanning periods to have the output of the counter P 101 shifted downward. Therefore, the fixed pattern signal is also shifted downward to bring the thrusting positions of the heads 2A and 2B closer to their on-track states. If the thrusting position of the head 2A is behind the track, the fixed pattern signal is shifted upward to bring the head 2A closer to the on-track state. This is accomplished by counting one cut-in pulse for every 2 field scanning periods when the counter P 101 is counting the signal FGP. For example, if the thrusting position of the head 2A onto the track is deviating by a distance corresponding to ½ TP at the initial state of reproduction, the deviated thrusting position of the head 2A is adjusted to an on-track position by allowing the counter P 101 to count 24 cut-in pulses. In this instance, the length of time required for the adjustment can be expressed as $48 \times 1/fv$ and the on-track state is obtainable within one second. Furthermore, in accordance with the arrangement of this embodiment, the deviation of the thrusting position of the head due to slippage between the capstan and the tape of course can be corrected.

Such being the arrangement of the embodiment, the tracking operation can be satisfactorily performed with the head brought to an on-track state by shifting the fixed pattern signal even in the event of still picture reproduction. It is another advantage of the embodiment that the tape can be brought to a stop without any timing arrangement for that purpose, so that the control arrangement of the whole apparatus can be simplified.

The pattern signal generating circuit 56 thus generates via the D/A converters 106 and 107 the fixed pattern signals for driving the conversion elements 3A and 3B to enable the reproducing heads 2A and 2B to trace a desired recording track at a desired tape travelling speed.

Details of Tracking Signal Generating Circuit

Figure 13:
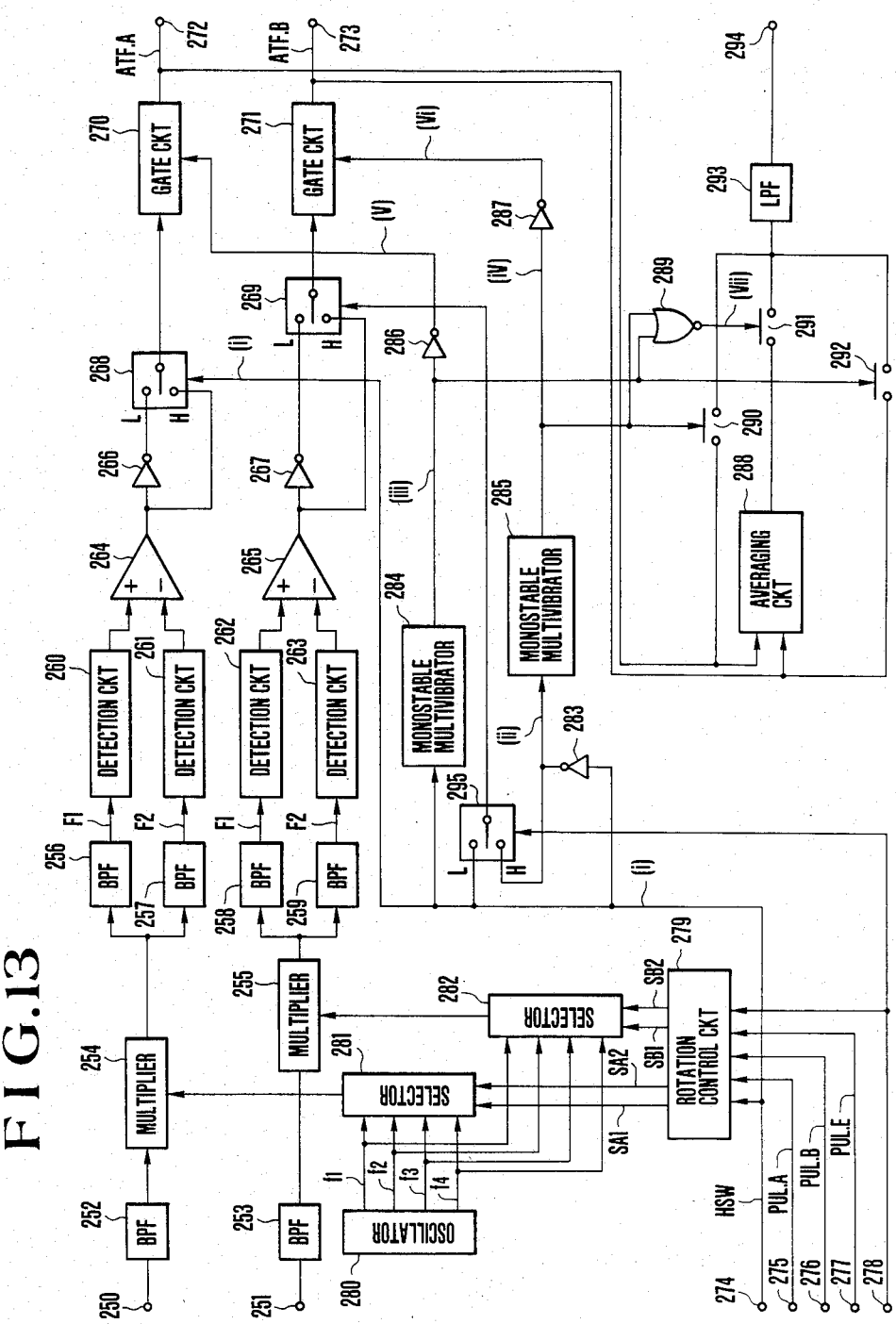
FIG. 13 is a circuit diagram showing, by way of example, the circuit arrangement of a tracking control circuit.

The signals ATF-A and ATF-B are generated in the following manner: The OR gate 151 of FIG. 7 produces a pulse signal when a carry signal or a borrow signal is generated at the counter P 101. This means the renewal of the reproducing track and, therefore, is supplied to the tracking signal generating circuit 53 as a track renewal pulse (PUL-E). The specific circuit arrangement of the tracking signal generating circuit 53 is as shown in FIG. 13. Referring to FIG. 13, a terminal 250 is arranged to receive a reproduced signal from the head 2A via the reproduction amplifier 51. A terminal 251 is arranged to receive a reproduced signal from the head 2B via the reproduction amplifier 51. Band-pass filters 252 and 253 (hereinafter referred to as BPF's) are arranged to separate pilot signal components of the above-stated four different kinds from the reproduced signals produced by the heads 2A and 2B. The pilot signal components separated by the BPF's 252 and 253 include the pilot signals obtained from the main track and two tracks adjacent to the main track. At multipliers 254 and 255, the signals separated by the BPF's 252 and 253 are multiplied by a reference signal which has the same frequency as the pilot signal recorded in the main track.

BPF's 256, 257, 258 and 259 are respectively arranged to extract components representing differences of the pilot signals of the two adjacent tracks from the pilot signal of the main track. Assuming that there obtain relations expressed as $(f2-f1)=(f4-f3)=F1$ and $(f4-f2)=(f3-f1)=F2$, the BPF's 256 and 258 respectively separate a component F1 while the BPF's 257 and 259 separate a component F2. The components F1 and F2 have their levels detected by detection circuits 260, 262, 261 and 263 respectively. A level difference between the components F1 and F2 is detected by differential amplifiers 264 and 265. In this instance, the direction of the tracks which produce the components F1 and F2 changes from one to the other. Therefore, the signals ATF are obtained with the components selectively taken out by switches 268 and 269, one through inverting amplifiers 266 and 267 and the other not through them. However, since the signals thus obtained become meaningless during a period other than a period during which the heads are reproducing the pilot signals, only the outputs of the switches 268 and 269 that are produced during this period are taken out via the gate circuits 270 and 271. The outputs of the gate circuits 270 and 271 are produced via terminals 272 and 273 as the tracking control signals ATF-A and ATF-B and are supplied to the pattern signal generating circuit 56 shown in FIG. 7.

Figure 14:
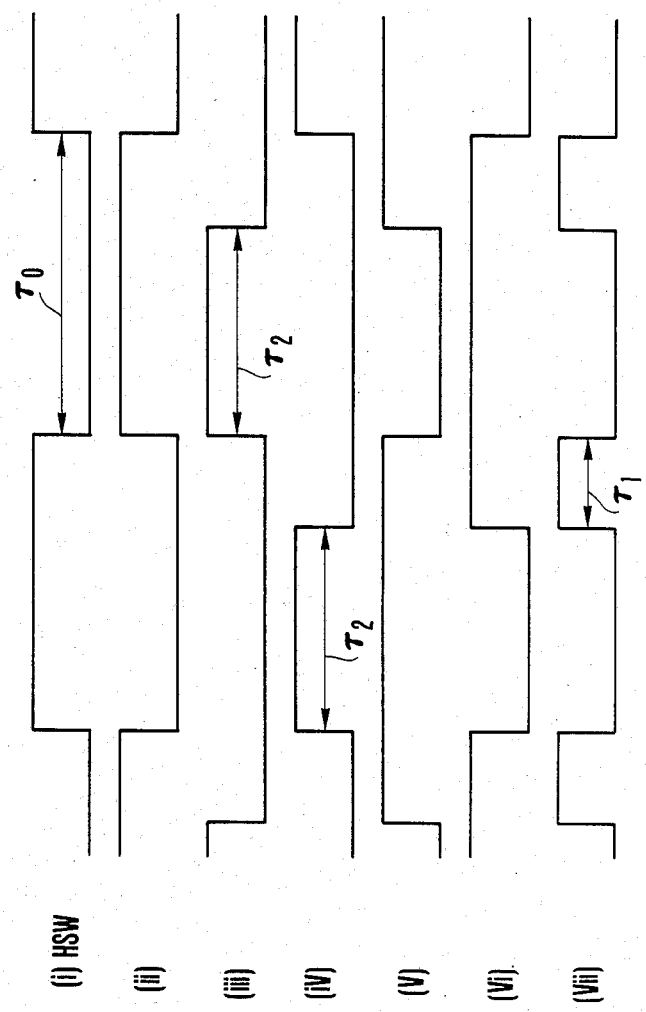
FIG. 14 is a timing chart showing the wave forms of various parts of FIG. 13.
Figure 15:
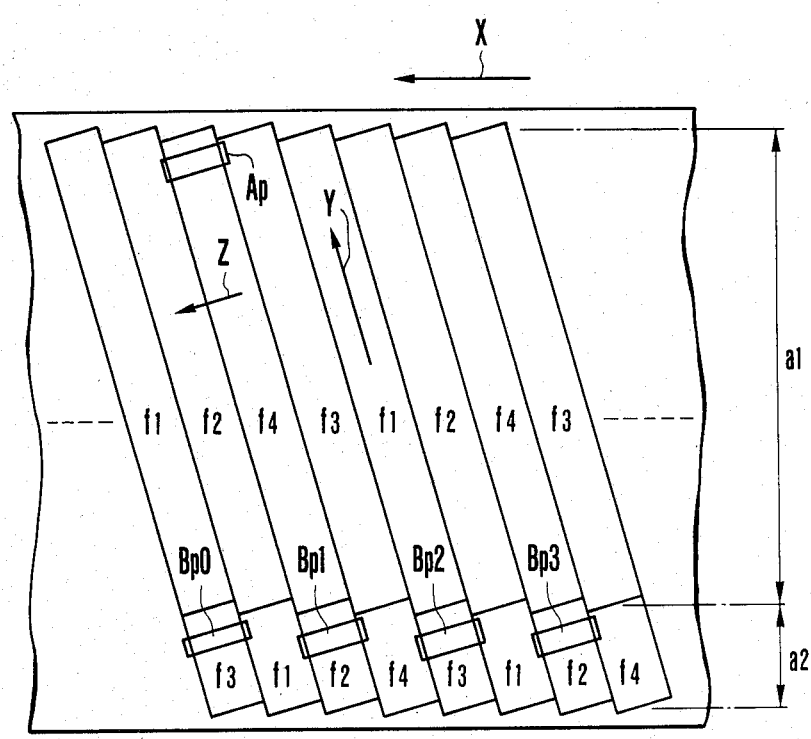
FIG. 15 is a plan view showing head positions on a magnetic tape in the event of varied speed reproduction.

FIG. 14 is a timing chart showing the wave forms of various parts of FIG. 13. FIG. 15 shows the positions of the heads on the magnetic tape at the time of varied speed reproduction. In the event of varied speed reproduction, the tracking control signals ATF are taken out at the following timing: The head switching (HSW) signal (i) which is supplied via the terminal 274 is arranged such that the head 2A traces the area a1 when it is at a high level as mentioned in the foregoing. Meanwhile, the head 2B traces the area a1 when the HSW signal (ii) which is obtained by inverting the HSW signal (i) through the inverter 283 is at a high level.

In case that the recording head which formed the track having the pilot signal f1 recorded in the area a1 thereof is of the same azimuth angle as that of the reproducing heads 2A and 2B, the track traced by the reproducing heads 2A and 2B during the varied speed reproduction has the pilot signal f1 or f4 recorded in the area a1. Therefore, when both the heads 2A and 2B are tracing the area a1, a pilot signal recorded in the adjacent track immediately before the main track (hereinafter referred to as front adjacent track) is obtained as a component F2 included in the output of the multiplier. Meanwhile, a pilot signal recorded in another adjacent track immediately after the main track (hereinafter referred to as rear adjacent track) is obtained as a component F1. Assuming that both the bimorph elements 3A and 3B are to be displaced in the direction of arrow Z as shown in FIG. 15 when a positive voltage is applied to these bimorph elements, the switches 268 and 269 are arranged to allow the outputs of the differential amplifiers 264 and 265 to be produced as they are when the heads 2A and 2B are tracing the area a1.

The switches 268 and 269 are arranged to be connected to their sides H when high level inputs are received at their control terminals which are indicated by arrows in the drawing. The above-stated HSW signal (i) is supplied to the control terminal of the switch 268 while the HSW signal (ii) which is obtained by inverting the HSW signal at the inverter 283 is supplied to the control terminal of the switch 269. A terminal 278 is arranged to receive a signal from a system control circuit 54 shown in FIG. 6 at a high level in the event of varied speed reproduction and at a low level in the case of normal reproduction or recording. This signal from the system control circuit 54 is also supplied to the control terminal of the switch 295. By this, the output signal of the inverter 283 is arranged to be led to the control terminal of the switch 269.

Monostable multivibrators 284 and 285 are arranged to be triggered by the fall edges of their input signals and to be inverted after the lapse of a predetermined period of time $\tau2$. Assuming that one field period which is a length of time required by the head for tracing the area a1 is $\tau0$ while another length of time required by the head for tracing the area a2 is $\tau1$, the above stated period of time 2 can be expressed as $\tau2=\tau0-\tau1$. Therefore, the outputs of the monostable multivibrators 284 and 285 which are represented by parts (iii) and (iv) of FIG. 14 respectively become high levels while the heads 2A and 2B are not tracing the area a1 nor the area a2. In other words, if these outputs (iii) and (iv) of the monostable multivibrators 284 and 285 are inverted, their levels become high while the heads 2A and 2B are reproducing the pilot signal. Therefore, inverters 286 and 287 are arranged to control the gate circuits 270 and 271 by inverting the outputs of the monostable multivibrators 284 and 285 as shown at parts (v) and (vi) in FIG. 14.

The tracking control signals ATF-A and ATF-B which are obtained in the above-stated manner are supplied to the pattern signal generating circuit 56 and the subtraction circuit 58 as mentioned in the foregoing. Then, the conversion elements 3A and 3B which are bimorph elements or the like are controlled by the tracking control signals. Meanwhile, the signals ATF-A and ATF-B are utilized also for controlling the capstan motor 11 during the travel of the tape. The signals to be supplied to the capstan motor control circuit 13 are arranged as follows:

The tracking control signal ATF-A is supplied to a switch 290 and an averaging circuit 288. Another signal AFT-B is supplied to a switch 292 and the averaging circuit 288. It is well known to control the capstan motor with a tracking control signal ATF. In the case of this embodiment, however, there are a signal ATF-A which is obtained from the head 2A and another signal ATF-B which is obtained from the other head 2B. At some point of time, these two signals are concurrently obtained. Therefore, in accordance with the arrangement of this embodiment, the signal ATF-A or the signal ATF-B is used as it is when they are not concurrently obtained. However, they are used in an averaged state when they are concurrently obtained. As apparent from the foregoing description, the period during which the signal ATF-A is alone obtained is when the output level of the monostable multivibrator 285 is high. The period during which the other signal ATF-B is alone obtained is when the output level of the monostable multivibrator 284 is high. Accordingly, the switch 290 is turned on when the output of the monostable multivibrator 285 is at a high level. The switch 292 is turned on when the output of the monostable multivibrator 286 is at a high level. During a period other than these periods, the level of the output of a NOR gate 298 becomes high as shown at a part (vii) in FIG. 14. During this period, the switch 291 is turned on. In this manner, one of the signals ATF-A and ATF-B and the average of them is selectively supplied to a low-pass filter (LPF) 293. The output of this LPF 293 is supplied to the capstan motor control circuit 13 via a terminal 294.

Next, in normal reproduction, the timing at which the tracking control signal ATF is taken out is as follows: Let us assume that recording and normal reproduction are to be performed by heads HA and HB which have different azimuth angles from each other. In this instance, the reproduced signals obtained from the heads HA and HB are supplied via the reproduction amplifier to the terminals 250 and 251 of FIG. 13 in the same manner as in the case of the heads 2A and 2B. Meanwhile, these signals are on the other hand combined by the head switching signal HSW into a reproduced video signal. If, in this instance, the head HA has the same azimuth angle as that of the heads 2A and 2B, the head HA traces a track having a pilot signal f1 recorded in the area a1 and another track having a pilot signal f4 recorded in the area a1 thereof as shown in FIG. 15. Meanwhile, the other head HB traces a track having a pilot signal f2 recorded therein and another track having another pilot signal f3 recorded therein. Therefore, the tracking control signal ATF to be generated on the basis of the reproduction signal of the head HA is obtained in the same manner as in the case of the head 2A. Whereas, components F1 and F2 extracted through BPF's 258 and 259 from a reproduction signal which is produced by the other head HB from the area a1 are derived from the front adjacent and rear adjacent tracks respectively and are reverse to those obtained by the head HA. This relation of course applies also to the other area a2. It is thus necessary to have the signal ATF produced from the inverting amplifier when the area a1 is being traced by the head HB. Therefore, unlike in the case of varied speed reproduction, the head switching signal HSW is supplied as it is via the side L of the switch 295 to the control terminal of the switch 269. By virtue of this arrangement, the tracking control signal ATF is obtained on the basis of the signals reproduced by the heads HA and HB. Further, a method for forming a signal to be supplied to the capstan motor control circuit 13 is identical with the method used in the case of varied speed reproduction and, therefore, requires no further description here.

Details of Rotation Control Circuit

Referring to FIG. 15, let us assume that the head 2A is at a position Ap. In other words, the head 2A is assumed to be in the area a1 of a track having the pilot signal f4 recorded therein. In the event of varied speed reproduction, the other head 2B comes into the area a2 of a track having a pilot signal f2 or f3 recorded therein as indicated by reference symbols Bp0, Bp1, Bp2 and Bp3 in FIG. 15. In other words, the pilot signals recorded in the tracks mainly traced by the heads 2A and 2B differs from each other. Accordingly, reference signals of different frequencies are then supplied to the multipliers 254 and 255.

When the pilot signal recorded in the area a2 of a given recording track is determined, the pilot signal recorded in the area a1 is positively determined. In other words, when the pilot signal f3 is recorded in the area a2, the pilot signal recorded in the area a1 is f1. If the pilot signal f2 is recorded in the area a2, the pilot signal recorded in the area a1 is f4. In the event of varied speed reproduction, the tracks to be traced by the heads 2A and 2B thus can be classified into these two kinds. Accordingly, pertinent reference signals can be supplied to the multipliers 254 and 255 by discriminating whether the track to be traced next is of the same kind or of the other kind. The pulse signal PUL-E which is described in the foregoing is usable for this discrimination.

Figure 16:
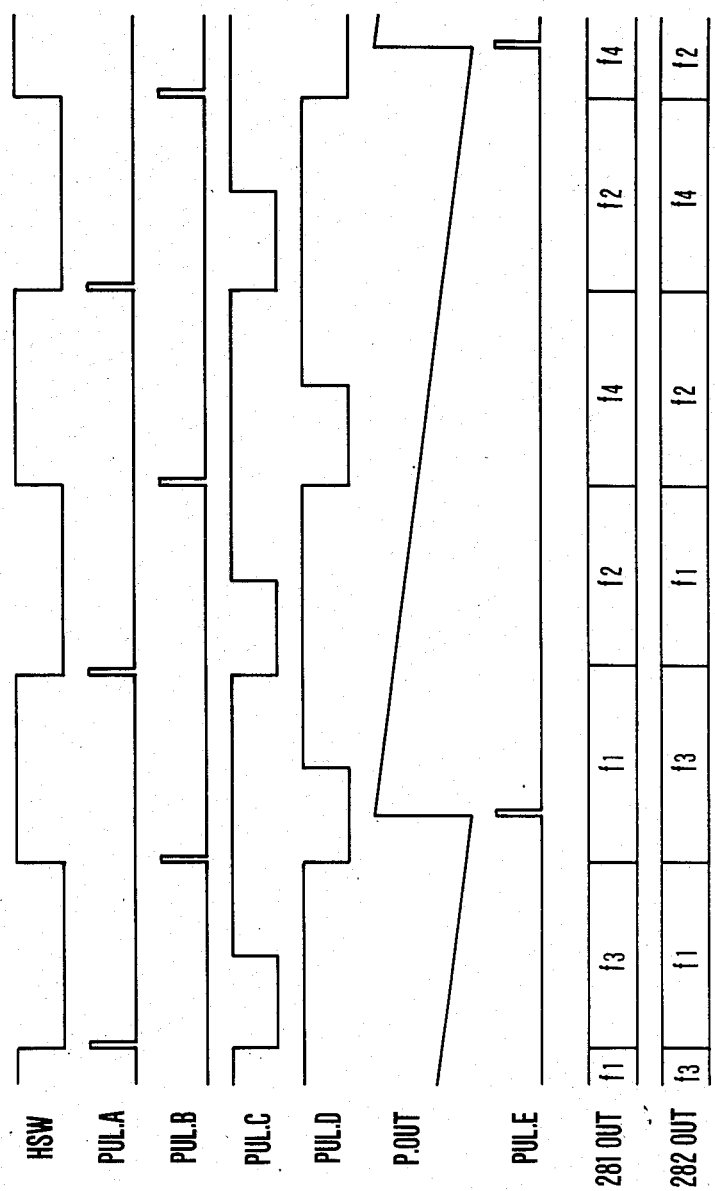
FIG. 16 is a timing chart showing the wave forms of various parts of the apparatus obtained in the event of normal ½ slow speed reproduction.

The operation of the embodiment at specific tape travel speeds is as follows: FIG. 16 is a timing chart showing the wave forms of various parts of the apparatus obtained in the case of normal ½ slow speed reproduction. A phase information signal which is generated at the counter P 101 by counting the capstan FG signal and is of a value indicated in an analog manner at a part P-OUT in FIG. 16 is loaded on the counters A 102 and B 103 by pulse signals PUL-A and PUL-B. Then, after the lapse of ½ field period, the levels of pulse signals PUL-C and PUL-D becomes high to cause the counters A 102 and B 103 to count the capstan FG signal. At the initial value take-in timing defined by the pulse signals PUL-A and PUL-B, the counter P 101 shows phase information for a recording track. Therefore, if no track renewal takes place during the initial value take-in timing, the track being traced remains the same. Further, the head 2A does not change its reproducing track during a period between two pulses of the pulse signal PUL-A. The other head 2B does not change its reproducing track during a period between two pulses of the pulse signal PUL-B.

In other words, with respect to the head 2A, the reproducing track remains unchanged if there is no pulse of the pulse signal PUL-E between the two pulses of the pulse signal PUL-A. If there is a pulse of the pulse signal PUL-E between two pulses of the pulse signal PUL-A, this indicates that one reproducing track is changed to another. The same situation applies also to the head 2B. Further, if no pulse of the pulse signal PUL-E exists between a pulse of the pulse signal PUL-A and a pulse of the pulse signal PUL-B, the heads 2A and 2B are tracing one and the same reproducing track after these pulses. If a pulse of the signal PUL-E is between them, tracks being reproduced are next but one to each other. The frequencies of the reference signals are generated by selectors 281 and 282 on the basis of this concept as shown at parts 281 OUT and 282 OUT in FIG. 16.

Let us consider a case where there are a plurality of pulses of the signal PUL-E between two pulses of the signal PUL-A or PUL-B. If the number of pulses of the signal PUL-E existing between the two pulses of the signal PUL-A is two, this means that the change-over or renewal of the reproducing track has been effected twice. Then, the head 2A continuously traces tracks having the same pilot signal recorded therein. In the event of three pulses of the signal PUL-E between two pulses of the signal PUL-A, it means three occurrences of track change-over and the head 2A traces tracks of the above-stated different kinds. Thus, generally speaking, in case where a (2n−1) number of the pulses of the signal PUL-E exist between two pulses of the signal PUL-A, the head 2A traces tracks which have different pilot signals recorded therein. In the case of a (2n) number of pulses of the signal PUL-E between two pulses of the signal PUL-A, the head 2A traces tracks having the same pilot signals recorded both in the areas a1 and a2. In the case of the other head 2B, the tracing operation thereof can be judged likewise from a number of the pulses of the signal PUL-E between two signals of the signal PUL-B. Further, tracing by each of the heads 2A and 2B likewise can be judged from a number of pulses of the signal PUL-E existing between one pulse of the signal PUL-A and that of the signal PUL-B.

Figure 17:
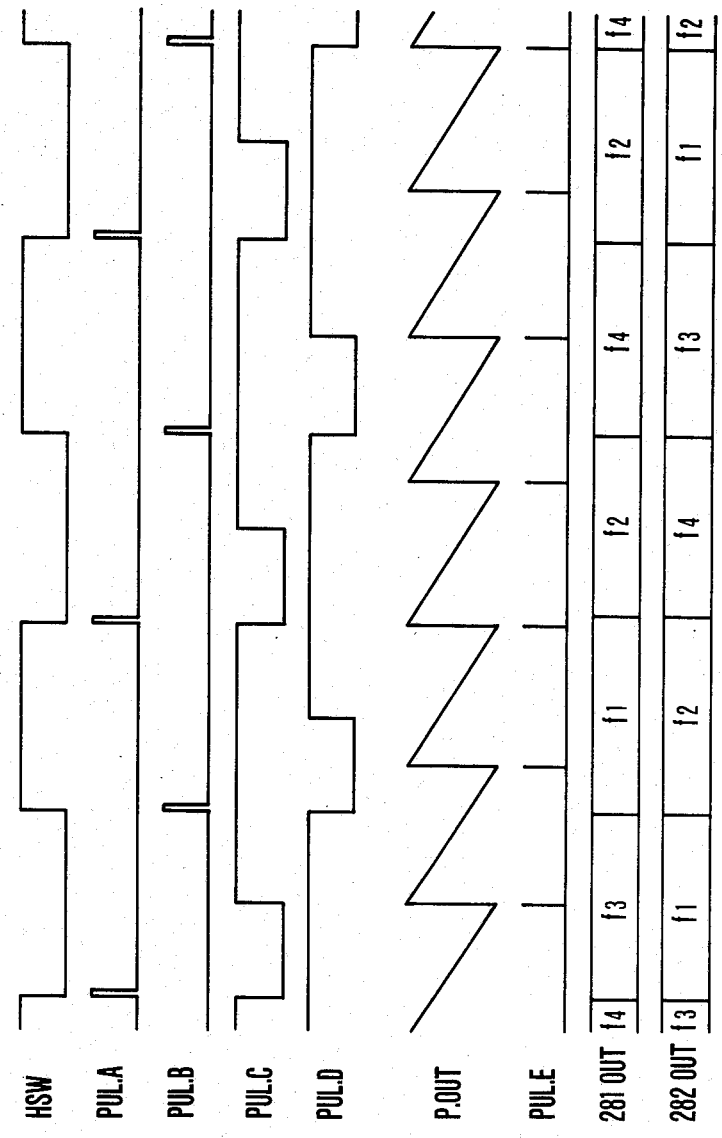
FIG. 17 is a timing chart showing the wave forms of various parts of the apparatus obtained in the event of a normal 8/3 speed searching operation.

FIG. 17 is a timing chart showing the wave forms of various parts of the apparatus obtained in the case of a normal 8/3 speed search operation. The chart shows at parts 281 OUT and 282 OUT therein the frequencies of the reference signals to be produced from the selectors 281 and 282 on the basis of the above-stated concept.

Figure 18:
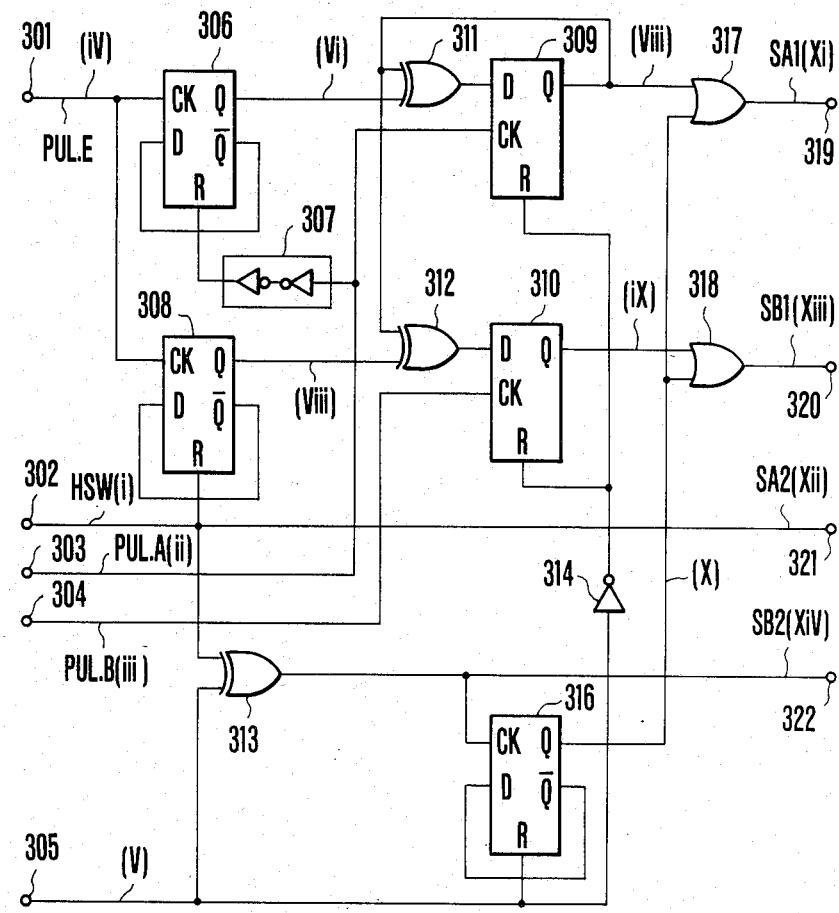
FIG. 18 is a circuit diagram showing, by way of example, a specific arrangement of a rotation control circuit.
Figure 19:
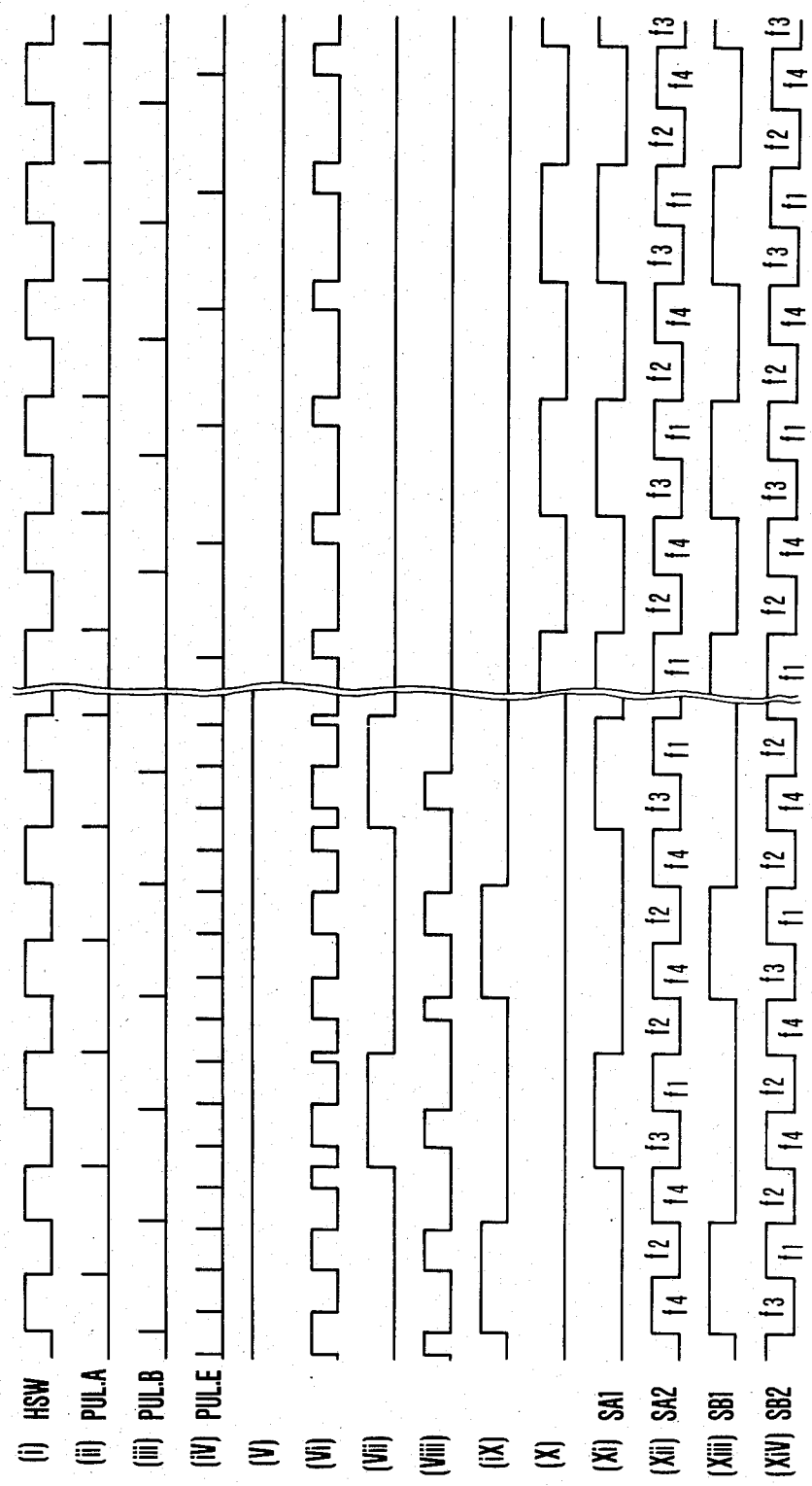
FIG. 19 is a timing chart showing the wave forms of the various parts of FIG. 18.

FIG. 18 is a circuit diagram showing a specific example of arrangement of the rotation control circuit 279 based on the above-stated principle. FIG. 19 is a timing chart showing the wave forms of various parts of FIG. 18. The circuit shown in FIG. 18 operates in the following manner: First, varied speed reproduction which is indicated on the left side of the timing chart of FIG. 19 will be described. Referring to FIG. 18, a flip-flop (hereinafter referred to as FF) 306 is arranged to discriminate whether the number of pulses of the signal PUL-E existing between two pulses of the signal PUL-A is an even number or an odd number. The FF 306 receives the signal PUL-A (part (ii) in FIG. 19) via a short time delay circuit 307 at its reset terminal R and the signal PUL-E (iv) at its clock terminal. The Q output of the FF 306 produced immediately before the FF 306 is reset is at a high level when the number of pulses of the signal PUL-E (iv) between two pulses of the signal PUL-A (ii) is an odd number and is at a low level when the number of pulses is an even number. Another FF 309 is arranged to have its Q output inverted only when the Q output of the FF 306 is at a high level immediately before the FF 306 is reset. Accordingly, it is possible to determine, from the Q output (vii) of the FF 309, which of the two kinds of tracks is being traced by the head 2A.

Meanwhile, an FF 308 is arranged to determine whether the number of pulses of the signal PUL-E (iv) existing between one pulse of the signal PUL-A (ii) and one pulse of the signal PUL-B (iii) is an odd number or an even number. The terminal R of the FF 308 is arranged to receive the head switching signal HSW (i) which is at a low level only during that period. An FF 310 is responsive to the timing defined by the signal PUL-B (iii) and is arranged to produce a Q output which differs from that of the FF 309 when the Q output of the FF 308 immediately before resetting is at a high level and to produce a Q output which is the same as that of the FF 309 when the Q output of the FF 308 is at a low level. Therefore, it is possible to determine, from the Q output (ix) of the FF 309, which of the above stated two kinds of recording tracks is being traced by the head 2B.

The head 2A is tracing a main track when the head switching signal HSW (i) is at a high level. In that instance, therefore, the frequency of the reference signal to be generated by the selector 281 is either f1 or f4. Meanwhile a terminal 305 is receiving a system control signal which is supplied to the terminal 278 of FIG. 13. This signal is at a high level in the event of varied speed reproduction. This causes the signal HSW to be inverted by an exclusive OR circuit (EXOR) 313. When the inverted signal HSW is at a high level, the frequency of the reference signal to be generated by the selector 82 is also either f1 or f4.

Therefore, the frequency of the reference signal to be generated by the selector 281 can be determined by using the Q output of the FF 309 and the signal HSW. Further, the frequency of the reference signal to be generated by the selector 282 can be determined by using the Q output of the FF 310 and the output of the EXOR 313. In the case of varied speed reproduction, the terminal R of the FF 316 receives a high level input. Therefore, the level of the Q output of the FF 316 becomes low. Then, the outputs of OR circuits 317 and 318 are equal respectively to the Q outputs of the FF's 309 and 310. Therefore, assuming that signals obtained from terminals 319, 320, 321 and 322 are SA1, SB1, SA2 and SB2, the frequency of the reference signal to be generated by the selector 281 is determined by the signals SA1 and SA2 and that of the reference signal to be generated by the other selector 282 is determined by the signals SB1 and SB2.

The selectors 281 and 282 shown in FIG. 13 are respectively arranged to produce the reference signal f1 when the signal SA1 or SB1 is at a high level and the signal SA2 or SB2 is also at a high level; to produce the reference signal f3 when the signal SA1 or SB1 is at a high level and the signal SA2 or SB2 is at a low level; to produce the reference signal f4 when the signal SA1 or SB1 is at a low level and the signal SA2 or SB2 is at a high level; and to produce the reference signal f2 when the signal SA1 or SB1 is at a low level and the signal SA2 or SB2 is also at a low level. The frequencies to be produced from these selectors 281 and 282 are as shown in parts (xii) and (xiv) in FIG. 19.

The operation for normal reproduction is as follows: in this case, the signal supplied to the terminal 305 is at a low level. Therefore, the terminals R of the FF's 309 and 310 receive a high level signal via an inverter 314. As a result of that, the levels of the outputs of these FF's 309 and 310 become low. Meanwhile, the FF 316 has the signal HSW supplied as it is to the input terminals CK thereof via the EXOR 313 and thus produces a Q output as shown on the right side of a part (x) in FIG. 19. This output is produced via OR circuits 317 and 318 as the signals SA1 and SB1 for normal reproduction. Then, reference signals can be generated as shown in FIG. 19 in the same frequency rotation as in recording.

The arrangement in the above-stated manner enables the apparatus to obtain the tracking control signal ATF from both the areas a1 and a2 at any tape speed.

Description of Other Parts

Figure 20:
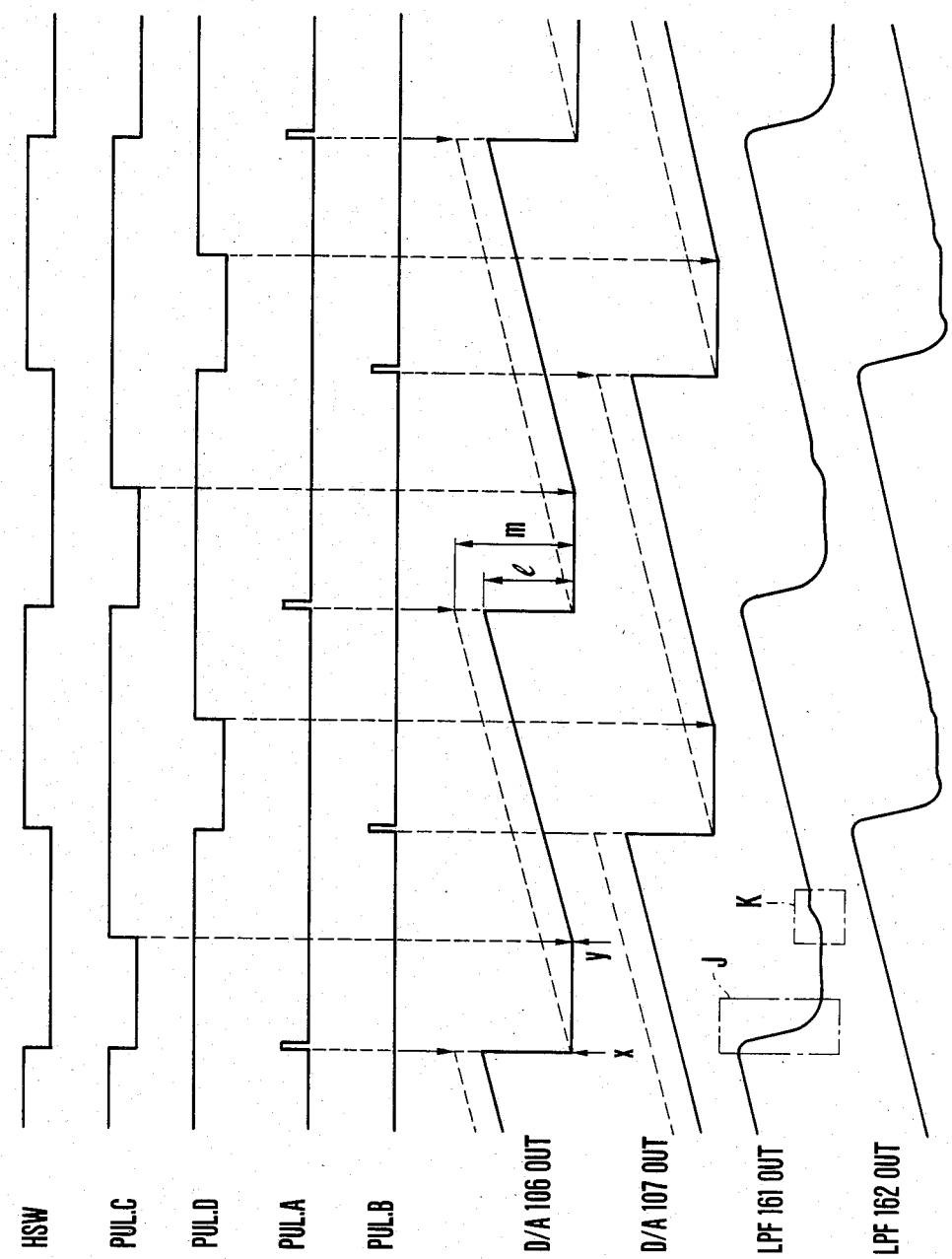
FIG. 20 is a timing chart showing voltages to be impressed on a conversion element.

The rest of the conversion element control circuit 55 are arranged as follows: FIG. 20 is a timing chart showing the voltages actually applied to the conversion elements 3A and 3B. LPF's 161 and 162 are arranged to remove the high frequency components of fixed pattern signals for the purpose of preventing the ringing phenomenon mentioned in the foregoing. In case that piezoelectric ceramics of a bimorph plate like shape is used as the conversion elements 3A and 3B, the ringing phonomenon takes place generally between 500 Hz and 1.5 KHz. In view of this, there are provided LPF's 161, 162, 193 and 194. However, if the cut-off frequency of these LPF's is lowered, a phase lag would arise in the pattern signals when they are allowed to pass through these LPF's.

Therefore, as shown at parts "LPF 161 OUT" and "LPF 162 OUT" in FIG. 20, the responsivity of the conversion elements becomes insufficient immediately after counters A 102 and B 103 take in from the counter P 101 the initial value thereof, as shown at a part J in FIG. 20, and immediately after these counters A 102 and B 103 begin to count as shown at a part K in FIG. 20. However, in this embodiment, this problem is completely solved in the following manner. Referring to FIG. 20, a timing point "x" for taking in the initial value and a timing point "y" for the start of count are arranged to be earlier by predetermined periods of time respectively than a timing point for the start of reproduction of a video signal, the former being earlier by one field period and the latter by 0.5 field period. This arrangement ensures that the period for reproduction of the video signal remains unperturbed at all.

With regard to the timing points "x" and "y", an excessively short interval between the points "x" and "y" would cause the displacement width of the conversion elements to become too large and is not desirable especially in the case of a bimorph plate of piezoelectric ceramics having a characteristic called the residual displacement.

A subtractor 171 is arranged to subtract the tracking control signals ATF-A and ATF-B from the fixed pattern signals for the heads 2A and 2B. A DC component removing circuit 59 is arranged to detect with an integrator 180 the average of DC components included in the signals produced from the subtraction circuit 58 and to remove it by means of differential amplifiers 181 and 182. The signals produced from the differential amplifiers 181 and 182 are applied to the piezoelectric conversion elements from terminals 211 and 212 via amplifiers 191 and 192, LPF's 193 and 194 and high voltage amplifiers 195 and 196 respectively.

Description of Modifications

In the embodiment described, the heads 2A and 2B which are used for varied tape speed reproduction are arranged to have the same azimuth angle. However, this invention is applicable also to an apparatus having heads of different azimuth angles. As for the number of heads to be used, four heads can be arranged to trace recording tracks one after another. In that case, the invention becomes more advantageous as the time interval can be made longer between the timing point "x" shown in FIG. 20 and the timing point for the start of reproduction of the video signal.

As for the frequencies of the reference signals, these signals are arranged to have the frequencies f1, f2, f4 and f3 which are the same as those of the pilot signals. However, the reference signals may be arranged to have some other frequencies. For example, the frequency f1 may be replaced with a frequency f1+fx and frequencies f2, f4 and f3 may be replaced respectively with frequencies f2+fx, f4+fx and f3+fx (fx: a desired frequency). Then, the same operation can be carried out with the passing bands of the BPF's suitably changed. In that case, however, a frequency component fx arises at the multipliers 254 and 255. Therefore, the frequency fx should be so determined as to facilitate removal of the fx component. Further, if the frequencies of the pilot signals are arranged to have the different frequencies in a relation f2−f1=f4−f3 as in the case of the embodiment given in the foregoing, a reference signal having a frequency of f1 (or f4)+fy (fy: a desired frequency) may be arranged to be used in cases where the pilot signal recorded in the main track is of the frequency f1 or f4. Then, in cases where the pilot signal of the main track is of the frequency f2 or f3, a reference signal of a frequency f2 (or f3)+fy may be used. In this instance, the passing bands of the BPF's 256, 257, 258 and 259 must be suitably changed accordingly, and the control over the switches 268 and 269 also must be changed. Further, where two reproducing heads 2A and 2B have the same azimuth angle, as in the case of the embodiment described, the reference signal of frequency f1 may be always used when the head is tracing the area a1 and the reference signal of frequency f2 always used when the head is tracing the area a2.

What is claimed is:

1. A rotary head type reproducing apparatus arranged to reproduce, with a plurality of rotary heads, an information signal from a record bearing medium having many recording tracks which are formed in parallel to each other with the information signal recorded therein ahd with a plurality of different pilot signals of different frequencies also recorded one by one in each of the recording tracks, comprising:
   (a) reference signal generating means for simultaneously generating a plurality of reference signals of different frequencies;
   (b) a plurality of separating means arranged to separate pilot signal components included in the reproduced signals produced from said plurality of heads individually for each of the heads; and
   (c) a plurality of detecting means for detecting the tracking errors of said heads by using said reference signals generated by said generating means and signals produced from said plurality of separating means.

2. An apparatus according to claim 1, wherein each of said many recording tracks includes a first area in which said information signal and one of said plurality of different pilot signals are recorded and a second area in which another pilot signal differing from said pilot signal recorded in said first area is recorded.

3. An apparatus according to claim 1, further comprising:
   moving means for moving said record bearing medium in a direction intersecting said many recording tracks; and
   first control means for controlling said moving means by using at least one of the outputs of said plurality of detecting means.

4. An apparatus according to claim 3, further comprising:

a plurality of shifting means for shifting said plurality of rotary heads in a direction intersecting said many recording tracks; and second control means for controlling at least one of said plurality of shifting means by using at least one of the outputs of said plurality of detecting means.

5. An apparatus according to claim 4, wherein said plurality of rotary heads are arranged to rotate on the same rotation plane when said plurality of shifting means are not shifting all of said plurality of rotary heads.

6. An apparatus according to claim 5, wherein said second control means includes:

first data generating means for generating, on the basis of the record bearing medium moving operation of said moving means, a first data indicative of a positional relation between said rotation plane and one of said many recording tracks relative to a predetermined rotation phase; and second data generating means for generating a second data indicative of a positional relation between said rotation plane and one of said many recording tracks in a continuous manner on the basis of information on a difference in inclination between said rotation plane and said many recording tracks.

7. An apparatus according to claim 6, wherein said second data is formed individually for each of said plurality of rotary heads.

8. An apparatus according to claim 6, wherein said second control means further includes control signal forming means for forming a plurality of control signals for controlling said plurality of shifting means by using signals produced from said plurality of detecting means and said second data.

9. An apparatus according to claim 6, wherein said second control means further includes adjusting means for adjusting said first data by using at least one of the outputs of said plurality of detecting means.

10. An apparatus according to claim 4, wherein said first control means includes means for forming a signal representing the average of signals produced from said plurality of detecting means.

11. A rotary head type reproducing apparatus arranged to reproduce, with a rotary head, an information signal from a record bearing medium having many recording tracks which are formed in parallel to each other with the information signal recorded therein, comprising:

(a) moving means for moving said record bearing medium in a direction intersecting said many recording tracks;

(b) shifting means for shifting said rotary head in a direction intersecting said many recording tracks;

(c) first data generating means for generating, on the basis of the record bearing medium moving operation of said moving means, a first data indicative of a positional relation between the rotation plane of said rotary head and one of said many recording tracks relative to a predetermined rotation phase of said rotary head;

(d) second data generating means for generating a second data which is continuously indicative of a positional relation between the rotation plane of said rotary head and one of said many recording tracks by adding information on a difference in inclination between the rotation plane and said many recording tracks to said first data which is generated at a timing point which is a predetermined period of time earlier than a timing point at which said rotary head begins to reproduce said information signal; and (e) driving means for driving said shifting means according to said second data.

12. An apparatus according to claim 11, wherein each of said many recording tracks includes a first area from which a reproduced information signal is obtained by said rotary head and a second area which is to be traced by said rotary head immediately before said first area; and said predetermined period of time is longer than a period during which said rotary head traces said second area.

13. An apparatus according to claim 12, wherein said first data is taken in by said second data generating means immediately after completion of a tracing action of said rotary head performed immediately before the tracing action on said recording track.

14. An apparatus according to claim 12, wherein one of a plurality of pilot signals of different kinds having different frequencies is recorded in each of said many recording tracks one by one together with said information signal, said apparatus further comprising means for detecting a tracking error on the basis of said pilot signals included in the reproduction output of said rotary head.

15. An apparatus according to claim 14, further comprising adjusting means for adjusting said first data by using the output signal of said detecting means.

16. An apparatus according to claim 14, wherein said driving means includes a mixing circuit which mixes a signal obtained on the basis of said second data with the output signal of said detecting means.

17. An apparatus according to claim 14, further comprising control means for controlling said moving means by using the output signal of said detecting means.

18. A rotary head type reproducing apparatus arranged to reproduce, with a rotary head, an information signal from a record bearing medium having many recording tracks which are formed in parallel to each other with the information signal recorded therein, comprising:

(a) moving means for moving said record bearing medium in a direction intersecting said many recording tracks;

(b) shifting means for shifting said rotary head in a direction intersecting said many recording tracks;

(c) first data generating means for generating, on the basis of the record bearing medium moving action of said moving means, a first data indicative of a positional relation between the rotation plane of said rotary head and one of said many recording tracks relative to a predetermined rotation phase of said rotary head;

(d) second data generating means for generating a second data which is continuously indicative of a positional relation between the rotation plane of the rotary head and one of said many recording tracks by adding information on a difference in inclination between the rotation plane and said many recording tracks to said first data which is generated at a predetermined timing;

(e) inhibiting means for inhibiting said second data generating means from adding the information on said difference in inclination at least for a portion of a period of time during which said rotary head is not reproducing said information signal; and (f) driving means for driving said shifting means according to said second data.

19. An apparatus according to claim 18, wherein each of said many recording tracks includes a first area from which a reproduced information signal is obtained by said rotary head and a second area which is to be traced by said rotary head immediately before said first area; and said inhibiting means is arranged to operate at least for a portion of a period of time during which said rotary head is not tracing said recording tracks.

20. An apparatus according to claim 18, wherein said first data generating means includes:
   pulse signal generating means for generating a pulse signal relative to the record bearing medium moving operation of said moving means; and
   first counting means for counting the pulses of said pulse signal, said first counting means being arranged to have the count value thereof return to the initial data thereof every time a predetermined number of pulses of said pulse signal are counted.

21. An apparatus according to claim 20, wherein said second data generating means includes:
   timing signal generating means for generating a timing signal relative to the rotation of said rotary head; and
   second counting means which is arranged to read said first data at a timing related to said timing signal and to count the pulses of said pulse signal.

22. An apparatus according to claim 21, wherein said inhibiting means includes gate means for controlling the supply of said pulse signal to said second counting means and control means for controlling said gate means on the basis of said timing signal.

23. A rotary head type reproducing apparatus arranged to reproduce, with a rotary head, an information signal from a record bearing medium having many recording tracks which are formed in parallel to each other with the information signal recorded therein and with a plurality of different pilot signals of different frequencies also recorded one by one therein together with said information signal, comprising:
   (a) reference signal generating means for selectively generating one of a plurality of reference signals having different frequencies;
   (b) separating means for separating, from a reproduced signal obtained by said rotary head, the components thereof which represent the pilot signals;
   (c) moving means for moving the record bearing medium in a direction intersecting said many recording tracks;
   (d) data forming means for forming data indicative of a positional relation between the rotation plane of said rotary head and one of said many recording tracks on the basis of the record bearing medium moving operation of said moving means with reference to a predetermined rotation phase of said rotary head;
   (e) first control means arranged to form a control signal for controlling the moving means by using said reference signal generated by said reference signal generating means and a signal produced by said separating means;
   (f) discerning means for discerning the kind of the pilot signal recorded in a recording track being mainly traced by said rotary head; and
   (g) second control means for controlling the selecting operation of said reference signal generating means on the basis of the output of said discerning means.

24. An apparatus according to claim 23, further comprising:
   shifting means for shifting said rotary head in a direction intersecting said many recording tracks; and
   driving means for driving said shifting means on the basis of said data and information on a difference in inclination between said rotation plane and said many recording tracks.

25. An apparatus according to claim 23, further comprising:
   adjusting means for adjusting said data on the basis of said control signal.

26. A rotary head type reproducing apparatus arranged to reproduce, with a rotary head, an information signal from a record bearing medium having many recording tracks which are formed in parallel to each other with the information signal recorded therein and with a plurality of different pilot signals of different frequencies also recorded one by one together with said information signal, comprising:
   (a) reference signal generating means for selectively generating one of a plurality of different reference signals having different frequencies;
   (b) separating means for separating, from a reproduced signal obtained by said rotary head, the components thereof which represent the pilot signals;
   (c) moving means for moving said record bearing medium in a direction intersecting said many recording tracks;
   (d) pulse signal generating means for generating a pulse signal relative to the moving operation of said moving means;
   (e) first control means arranged to form a control signal for controlling said moving means by using said reference signal generated by said reference signal generating means and a signal produced from said separating means; and
   (f) second control means arranged to control the selecting operation of said reference signal generating means by using said control signal and said pulse signal.

27. An apparatus according to claim 26, further comprising:
   shifting means for shifting said rotary head in a direction intersecting said many recording tracks; and
   driving means for driving said shifting means by using said control signal and said pulse signal.

28. An apparatus according to claim 26, wherein said second control means includes:
   data forming means for forming, by using said pulse signal, data indicative of a positional relation between the rotation plane of said rotary head and one of said many recording tracks with reference to a predetermined rotation phase of said rotary head;
   adjusting means for adjusting said data on the basis of said control signal; and
   discerning means for discerning, on the basis of said data, the kind of one of said pilot signals recorded in a recording track being mainly traced by said rotary head at said predetermined rotation phase.

29. An apparatus according to claim 26, wherein said second control means controls said selecting operation at every rotating period of said rotary head.

30. A rotary head type reproducing apparatus arranged to reproduce, with a pair of rotary heads, an information signal from a record bearing medium having many recording tracks which are formed in parallel to each other with said information signal recorded therein and with a four kinds of pilot signals of different frequencies also recorded one by one together with said information signal therein, comprising:

(a) reference signal generating means for simultaneously generating four kinds of reference signals having different frequencies;

(b) a pair of selecting means, each of which being arranged to selectively produce one of said four kinds of reference signals;

(c) moving means for moving said record bearing medium in a direction intersecting said many recording tracks;

(d) pulse signal generating means for generating a pulse signal relative to the operation of said moving means;

(e) a pair of separating means, each of said separating means being arranged to separate, from a reproduced signal obtained by one of said pair of rotary heads, the components thereof which represent said pilot signals;

(f) first control means arranged to form a control signal for controlling said moving means by using a pair of reference signals produced from said pair of selecting means and signals produced from said pair of separating means;

(g) means for generating a pair of timing signals relative to the rotation of said pair of rotary heads; and (h) second control means for controlling said pair of selecting means by using said control signal, said pulse signal and said pair of timing signals.

* * * * *